(12) United States Patent
Kato

(10) Patent No.: US 10,298,881 B2
(45) Date of Patent: *May 21, 2019

(54) COMMUNICATION TERMINAL, COMMUNICATION SYSTEM, COMMUNICATION METHOD, AND RECORDING MEDIUM

(71) Applicant: Ricoh Company, Ltd., Tokyo (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,245

(22) Filed: Oct. 13, 2017

(65) Prior Publication Data

US 2018/0048861 A1 Feb. 15, 2018

Related U.S. Application Data

(63) Continuation of application No. 15/074,241, filed on Mar. 18, 2016, now Pat. No. 9,854,205.

(30) Foreign Application Priority Data

Mar. 31, 2015 (JP) .................. 2015-073388
Mar. 9, 2016 (JP) .................. 2016-046204

(51) Int. Cl.
*H04W 4/00* (2018.01)
*H04N 7/14* (2006.01)
(Continued)

(52) U.S. Cl.
CPC ......... *H04N 7/147* (2013.01); *H04L 12/1818* (2013.01); *H04L 65/1069* (2013.01);
(Continued)

(58) Field of Classification Search
CPC ....... H04W 4/005; H04W 4/008; H04W 4/20; H04W 4/00; H04W 88/06; H04L 12/1818;
(Continued)

(56) References Cited

U.S. PATENT DOCUMENTS 8,294,747 B1 10/2012 Weinberg et al.
8,363,086 B1 * 1/2013 Shah .................. H04L 67/141
348/14.02

(Continued)

FOREIGN PATENT DOCUMENTS

EP 2 800 364 A1 11/2014
JP 2012-178135 9/2012
(Continued)

OTHER PUBLICATIONS

Extended European Search Report dated Jul. 29, 2016 in European Patent Application No. 16163317.7.
(Continued)

*Primary Examiner* — Jean A Gelin
(74) *Attorney, Agent, or Firm* — Oblon, McClelland, Maier & Neustadt, L.L.P.

(57) ABSTRACT

A communication terminal receives, from a mobile terminal, first terminal identification information for identifying a first communication terminal that is located remotely from the communication terminal, the mobile terminal being a mobile terminal that has obtained the first terminal identification information from the first communication terminal, determines the first communication terminal identified with the first terminal identification information as a communication destination, and starts communicating with the first communication terminal.

15 Claims, 24 Drawing Sheets

(51) Int. Cl.
*H04W 4/80* (2018.01)
*H04L 12/18* (2006.01)
*H04L 29/06* (2006.01)

(52) U.S. Cl.
CPC ........ *H04L 65/403* (2013.01); *H04L 65/4015* (2013.01); *H04W 4/80* (2018.02)

(58) Field of Classification Search
CPC ............... H04L 65/1069; H04L 65/403; H04L 65/4015
USPC ... 455/414.1, 432.3, 433, 435.1, 450, 452.1, 455/41.1, 41.2, 550.1, 517, 420
See application file for complete search history.

(56) References Cited

U.S. PATENT DOCUMENTS

| | | |
|---|---|---|
| 2013/0005377 A1 | 1/2013 | Wang et al. |
| 2014/0006970 A1 | 1/2014 | Casey et al. |
| 2014/0077937 A1 | 3/2014 | Kato et al. |
| 2014/0189058 A1 | 7/2014 | Asai |
| 2014/0324975 A1 | 10/2014 | Tamura |
| 2015/0081789 A1 | 3/2015 | Okuyama et al. |
| 2015/0312284 A1* | 10/2015 | Mihara ............... H04L 65/4038 370/260 |
| 2015/0365526 A1 | 12/2015 | Mihara et al. |

FOREIGN PATENT DOCUMENTS

| | | |
|---|---|---|
| JP | 2013-085208 | 5/2013 |
| JP | 2014-060552 | 4/2014 |
| JP | 2014-146281 | 8/2014 |
| JP | 2015-056860 | 3/2015 |

OTHER PUBLICATIONS

European Office Action dated Oct. 27, 2017 in Patent Application No. 16 163 317.7.

European Action dated Jun. 28, 2018 in European Application No. 16163317.7.

* cited by examiner

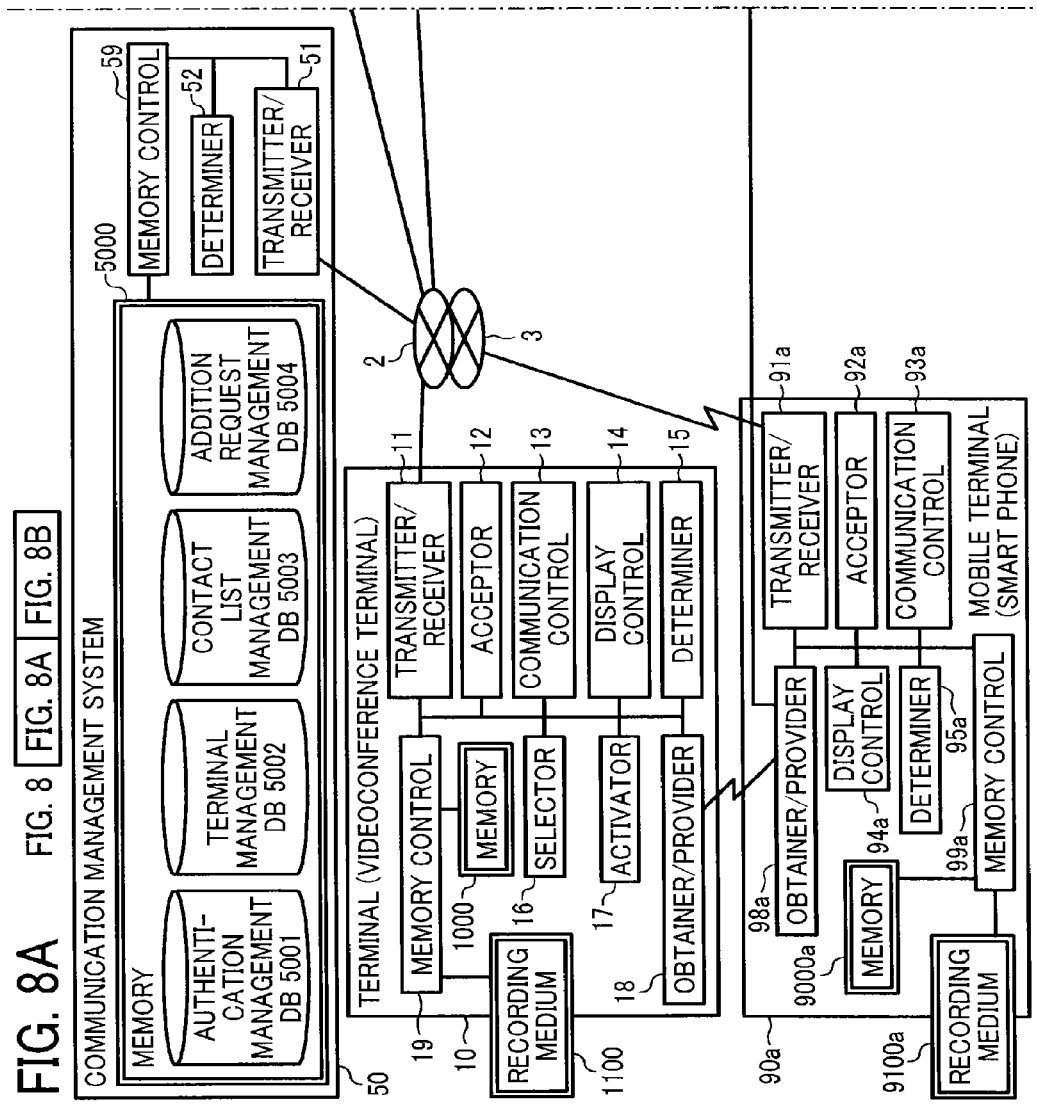

FIG. 9

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | ONLINE (COMMUNICATION OK) | 2014.4.09.12:00 | 1.2.1.4 |
| ... | ... | ... | ... | ... |
| 01ba | BA TERMINAL, BEIJING OFFICE, CHINA | OFFLINE | 2014.4.10.13:45 | 1.2.2.3 |
| 07bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 07db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ⋯, 01ba, 07bb, ⋯, 01ca, 01cb, 01da, 07db, ⋯ |
| 01ab | 01aa, 01ca, 01cb |
| 01ba | 01ab, 01ca, 01cb, 01da, 07db |
| ⋯ | ⋯ |
| 07db | 01aa, 01ab, 01ba, ⋯, 01da, 01ca, 01cb, ⋯, 01da |
| ⋯ | ⋯ |

FIG. 12

ADDITION REQUEST MANAGEMENT TABLE

| REQUEST SENDER TERMINAL ID | REQUEST DESTINATION TERMINAL ID |
|---|---|
| 07ba | 07aa |
| 01aa | 07db |
| ⋯ | ⋯ |

FIG. 13

| BLOCK NO. | DATA |
|---|---|
| 1 [UNIQUE NUMBER] | 1234567 |
| 2 [USER NAME] | Kato |
| 3 [(OBTAIN) TERMINAL ID(1)] | 07db |
| 4 [(OBTAIN) TERMINAL ID(2)] | |
| 5 [(OBTAIN) TERMINAL ID(3)] | |
| 6 [(RECEIVE) TERMINAL ID(1)] | |
| 7 [(RECEIVE) TERMINAL ID(2)] | |
| 8 [(RECEIVE) TERMINAL ID(3)] | |

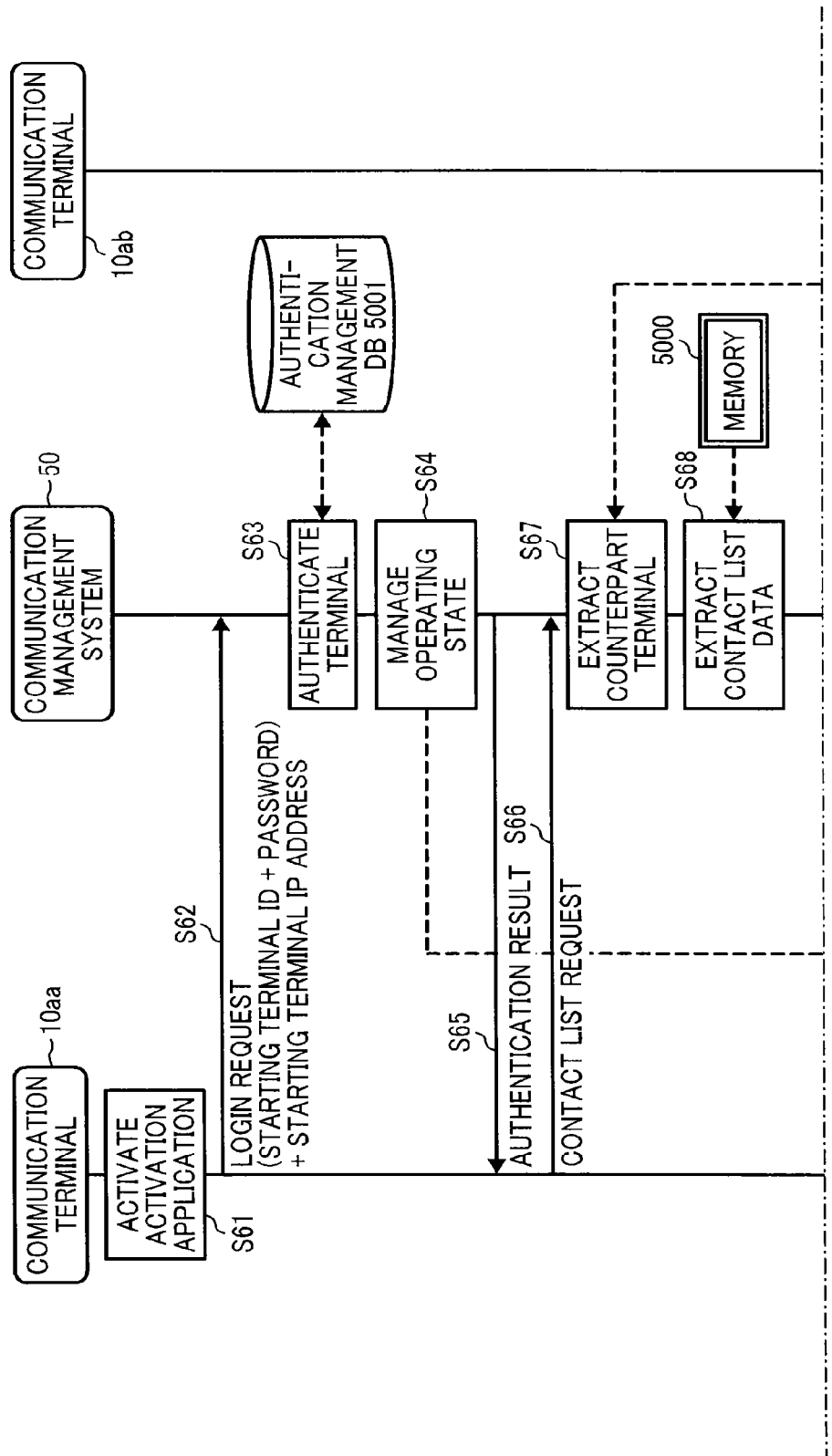

FIG. 17

| OPERATING STATE | TERMINAL ID | COUNTERPART NAME |
|---|---|---|
| 📞 | 01ab | AB TERMINAL, OSAKA OFFICE, JAPAN |
| 📞 | 01ba | BA TERMINAL, BEIJINIG OFFICE, CHINA |
| 📞 | 07db | DB TERMINAL, LONDON OFFICE, EUROPE |
| 📞 | 01cb | CB TERMINAL, NEW YORK OFFICE, U.S. |

ADD TO CONTACT LIST

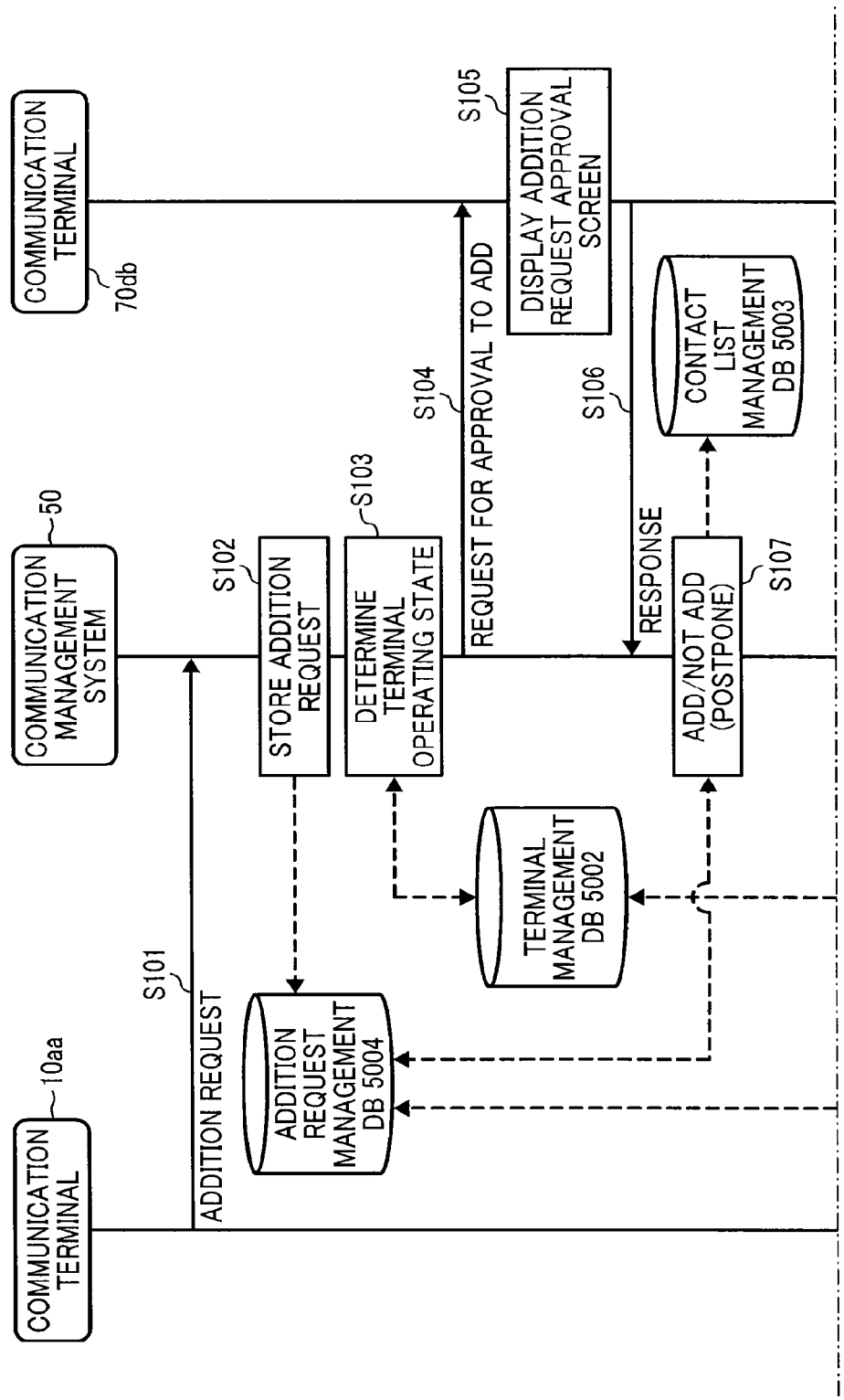

FIG. 21

ADDITION REQUEST TO CONTACT LIST IS RECEIVED FROM "AA TERMINAL, TOKYO OFFICE, JAPAN".
ACCEPT ADDITION REQUEST?

| YES | NO | CANCEL |

COMMUNICATION TERMINAL, COMMUNICATION SYSTEM, COMMUNICATION METHOD, AND RECORDING MEDIUM

CROSS-REFERENCE TO RELATED APPLICATIONS

This patent application is a continuation of U.S. application Ser. No. 15/074,241, filed Mar. 18, 2016, which is based on and claims priority pursuant to 35 U.S.C. § 119(a) to Japanese Patent Application Nos. 2015-073388, filed on Mar. 31, 2015, and 2016-046204, filed on Mar. 9, 2016, in the Japan Patent Office, the entire disclosure of each of which are hereby incorporated by reference herein.

BACKGROUND

Technical Field

The present invention relates to a communication terminal, a communication system including the communication terminal, a communication method, and a non-transitory recording medium storing a communication control program.

Description of the Related Art

Recently, videoconference systems are widely used. The videoconference systems transmit or receive image data and audio data among a plurality of communication terminals such as videoconference terminals.

In order to start communication with a counterpart communication terminal, a user at a communication terminal usually selects one communication terminal from among a plurality of communication terminals previously registered. This could be cumbersome and time-consuming, especially in case there are many of registered communication terminals. Further, in case a counterpart communication terminal has not been registered, the user has to manually enter a destination address, or newly register the counterpart communication terminal, before starting communication.

SUMMARY

Example embodiments of the present invention include a communication terminal to communicate with a counterpart communication terminal. The communication terminal receives, from a mobile terminal, first terminal identification information for identifying a first communication terminal that is located remotely from the communication terminal, the mobile terminal being a mobile terminal that has obtained the first terminal identification information from the first communication terminal, determines the first communication terminal identified with the first terminal identification information as a communication destination, and starts communicating with the first communication terminal.

Example embodiments of the present invention include a method performed by the communication terminal, a communication system including the communication terminal, and a non-transitory recording medium storing a control program for causing one or more processors to perform the communication method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A and 8B (FIG. 8) are a schematic block diagram illustrating a functional configuration of the communication system of FIG. 1 according to the embodiment of the present invention;

FIG. 9 is an illustration of an example data structure of an authentication management table;

FIG. 10 is an illustration of an example data structure of a terminal management table;

FIG. 11 is an illustration of an example data structure of a contact list management table;

FIG. 12 is an illustration of an example data structure of an addition request management table;

FIG. 13 is an illustration of an example data structure of a near-distance communication circuit;

FIGS. 16A and 16B (FIG. 16) are a data sequence diagram illustrating operation of preparing for communication between the communication terminals of the communication system of FIG. 1;

FIG. 17 is an illustration of an example contact list screen;

FIGS. 20A and 20B (FIG. 20) are a data sequence diagram illustrating operation of adding a candidate counterpart terminal to a contact list, according to an embodiment of the present invention;

FIG. 21 is an illustration of an example screen for requesting approval to add a candidate counterpart terminal to the contact list.

Figure 1:
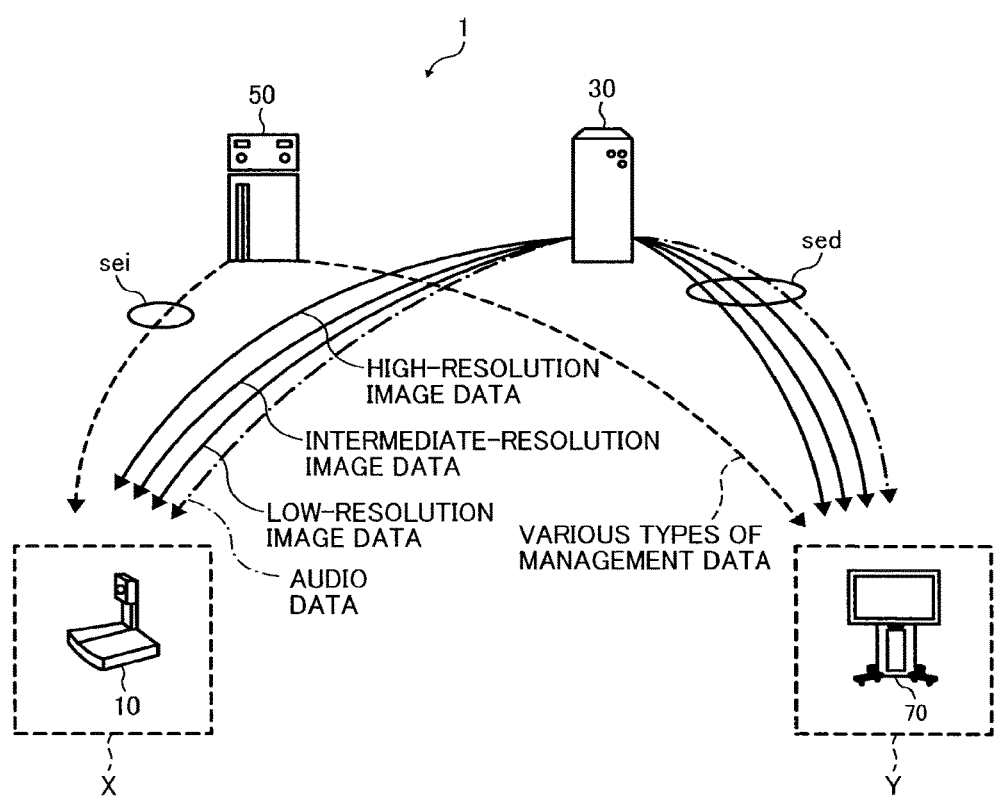
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, an embodiment of the present invention is described.

Configuration of Communication System

Referring to FIG. 1, a communication system 1 for carrying out videoconference among a plurality of communication terminals (10, 70) is described according to the embodiment. FIG. 1 is a schematic diagram illustrating a portion of the communication system 1, which relates to videoconference being carried out between the communication terminals 10 and 70.

In the following, it is assumed that the communication system 1 manages transmission of content data to carry out videoconference among the terminals. Alternatively, the communication system 1 may manage transmission of content data to carry out casual conversation among the users at different sites.

The communication system 1 includes the plurality of communication terminals (10, 70), a relay device 30, and a communication management system 50. The communication terminal transmits or receives image data and audio data as an example of content data. In FIG. 1, the communication terminal may be implemented by a videoconference terminal 10 in one example, or by an electronic whiteboard 70 in another example. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10 is referred to as the starting terminal, and the communication terminal 70 is referred to as the counterpart terminal. Alternatively, when the communication terminal 70 requests to start videoconference with the communication terminal 10, the communication terminal 70 is referred to as the starting terminal, and the communication terminal 10 is referred to as the counterpart terminal. Note that the communication terminal may be used not only for communication between different offices or for communication between different rooms in the same office, but also for communication within the same room or for outdoor-indoor communication or outdoor-outdoor communication.

The relay device 30 relays content data among the plurality of communication terminals. The communication management system 50 centrally controls login authentication of the communication terminal, management of the communication state of the communication terminal, management of a contact list, and management of the communication state or the like of the relay device 30. The relay devices 30 and the management system 50 in the above-described embodiment may be configured by a single computer or a plurality of computers to which divided portions (functions) are arbitrarily allocated.

In the communication system 1, a management data session "sei" is established between the starting terminal 10 and the counterpart terminal 70 via the communication management system 50 to transmit or receive various management data. Between the starting terminal 10 and the counterpart terminal 70, four sessions are established via the relay device 30 to transmit or receive four items of data including high-resolution image data, intermediate-resolution image data, low-resolution image data, and audio data. In FIG. 1, these four sessions are collectively referred to as image and audio data session "sed". The image and audio data session "sed" may not always include four sessions, but any number of sessions greater than or less than four. Any communication terminal (10 or 70) may communicate with each other through directly establishing a session with each other without intervening the relay device 30.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In the case of a very wide band path, high-quality image data including low-resolution image data serving as a base image, intermediate-resolution image data, and high-resolution image data is relayed. Since audio data is relatively small in data size, the audio data is relayed even in the case of a narrow band path.

Hardware Configuration of Communication System

Now, a hardware configuration of the communication system 1 is described.

Hardware Configuration of Videoconference Terminal

Figure 2:
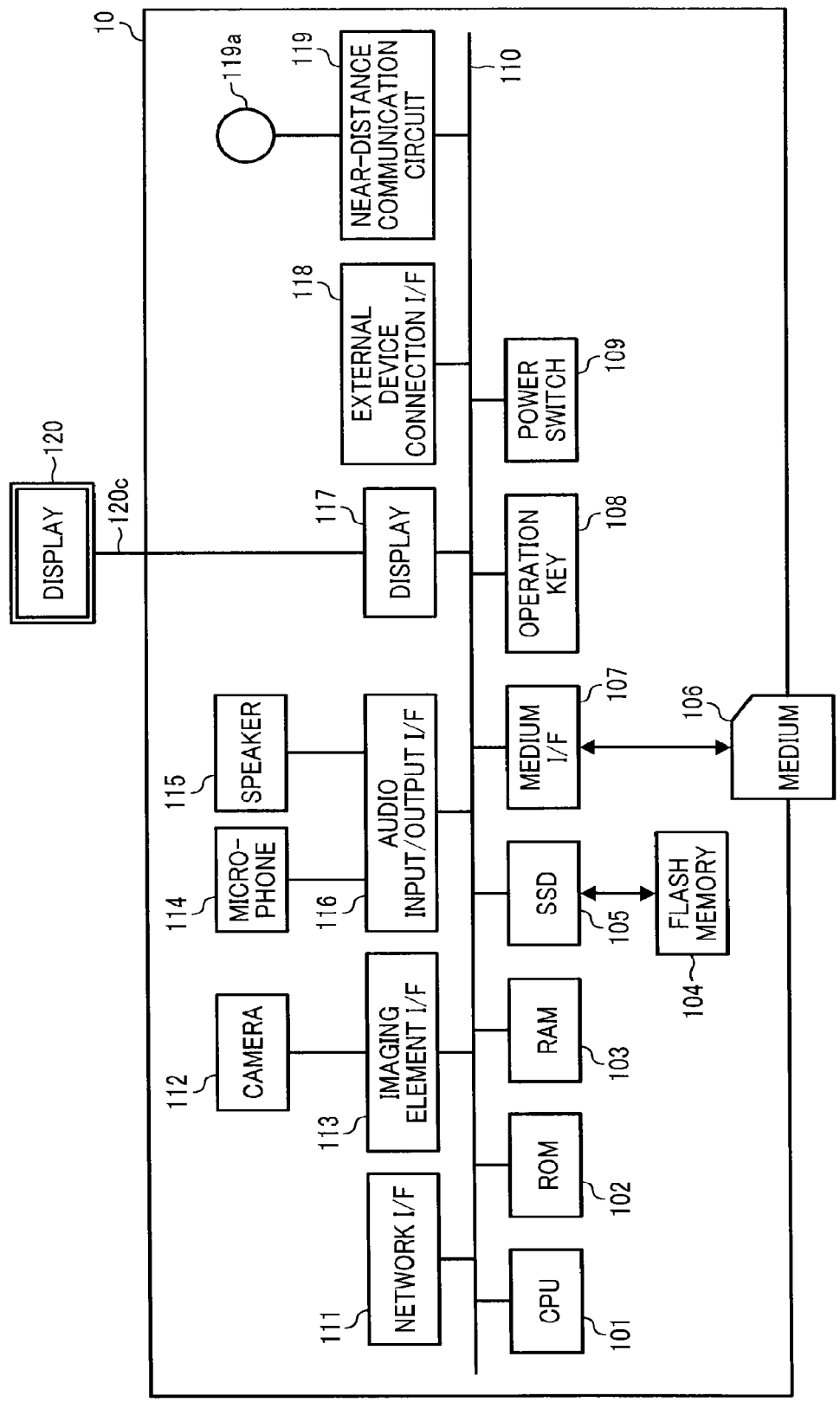
FIG. 2 is a schematic block diagram illustrating a hardware configuration of a communication terminal of the communication system of FIG. 1.

FIG. 2 illustrates a hardware configuration of the videoconference terminal according to the embodiment of the present invention. As illustrated in FIG. 2, the videoconference terminal as an example of the communication terminal includes a central processing unit (CPU) 101, a read only memory (ROM) 102, a random access memory (RAM) 103, a flash memory 104, a solid state drive (SSD) 105, a medium interface (I/F) 107, an operation key 108, a power switch 109, a bus line 110, a network I/F 111, a camera 112, an imaging device 1/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the communication terminal 10. The ROM 102 stores a control program for operating the CPU 101 such as an Initial Program Loader (IPL). The RAM 103 is used as a work area for the CPU 101. The flash memory 104 stores various data such as a communication control program, image data, and audio data. The SSD 105 controls reading or writing of various data to or from the flash memory 105 under control of the CPU 101. In alternative to the SSD, a hard disk drive (HDD) may be used. The medium I/F 107 controls reading or writing of data with respect to a recording medium 106 such as a flash memory. The operation key 108 is operated by a user to input a user instruction such as a user selection of a destination of the communication terminal 10. The power switch 109 turns on or off the power of the communication terminal 10.

The network I/F 111 allows communication of data with an external device through a communication network 2 such as the Internet. The camera 112 is an example of imaging device capable of capturing a subject under control of the CPU 101, and may be incorporated in the communication terminal. The imaging element device 1/F 113 is a circuit that controls driving of the camera 112. The microphone 114 is an example of audio collecting device capable of inputting audio under control of the CPU 101, and may be incorporated in the communication terminal. The audio I/O I/F 116 is a circuit for inputting or outputting an audio signal between the microphone 114 and the speaker 115 under control of the CPU 101. The display I/F 117 is a circuit for transmitting image data to the external display 120 under control of the CPU 101. The external device connection I/F 118 is an interface circuit that connects the terminal 10 to various external devices. The near-distance communication circuit 119 is a communication circuit in compliance with a near-field communication (NFC; Registered Trademark) or Bluetooth (Registered Trademark).

The bus line 110 may be an address bus or a data bus, which electrically connects various elements such as the CPU 101 of FIG. 2.

The display 120 may be a liquid crystal or organic electroluminescence (EL) display that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead.

Hardware Configuration of Communication Management System and Relay Device

Figure 3:
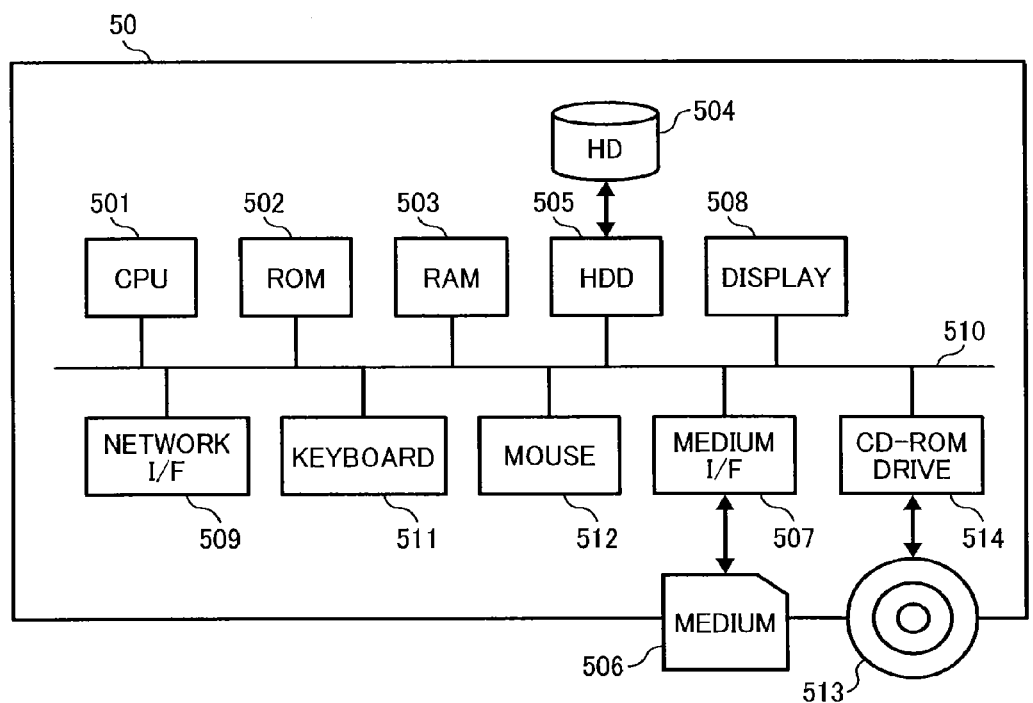
FIG. 3 is a schematic block diagram illustrating a hardware configuration of a communication management system and a relay device of the communication system of FIG. 1.

Referring to FIG. 3, a hardware configuration of the communication management system 50 and the relay device 30 is described according to an embodiment of the present invention. The communication management system 50, which may be implemented by a server computer, includes a central processing unit (CPU) 501, a read only memory (ROM) 502, a random access memory (RAM) 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510.

The CPU 510 controls entire operation of the communication management system 50. The ROM 502 stores a control program for controlling the CPU 501 such as an IPL. The RAM 503 is used as a work area for the CPU 501. The HD 504 stores various data such as the communication management program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 allows communication of data with an external device through the communication network 2 such as the Internet. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-ROM drive 514 reads or writes various data with respect to a CD-ROM 513, which is one example of removable recording medium.

The bus line 510 may be an address bus or a data bus, which electrically connects various elements such as the CPU 501 of FIG. 3.

Since the relay device 30 in FIG. 1 is substantially similar in hardware configuration to the communication management system 50, the description thereof is omitted. The relay device 30, however, stores a relay control program in the HD 504 in alternative to the management program.

Hardware Configuration of Electronic Whiteboard

Figure 4:
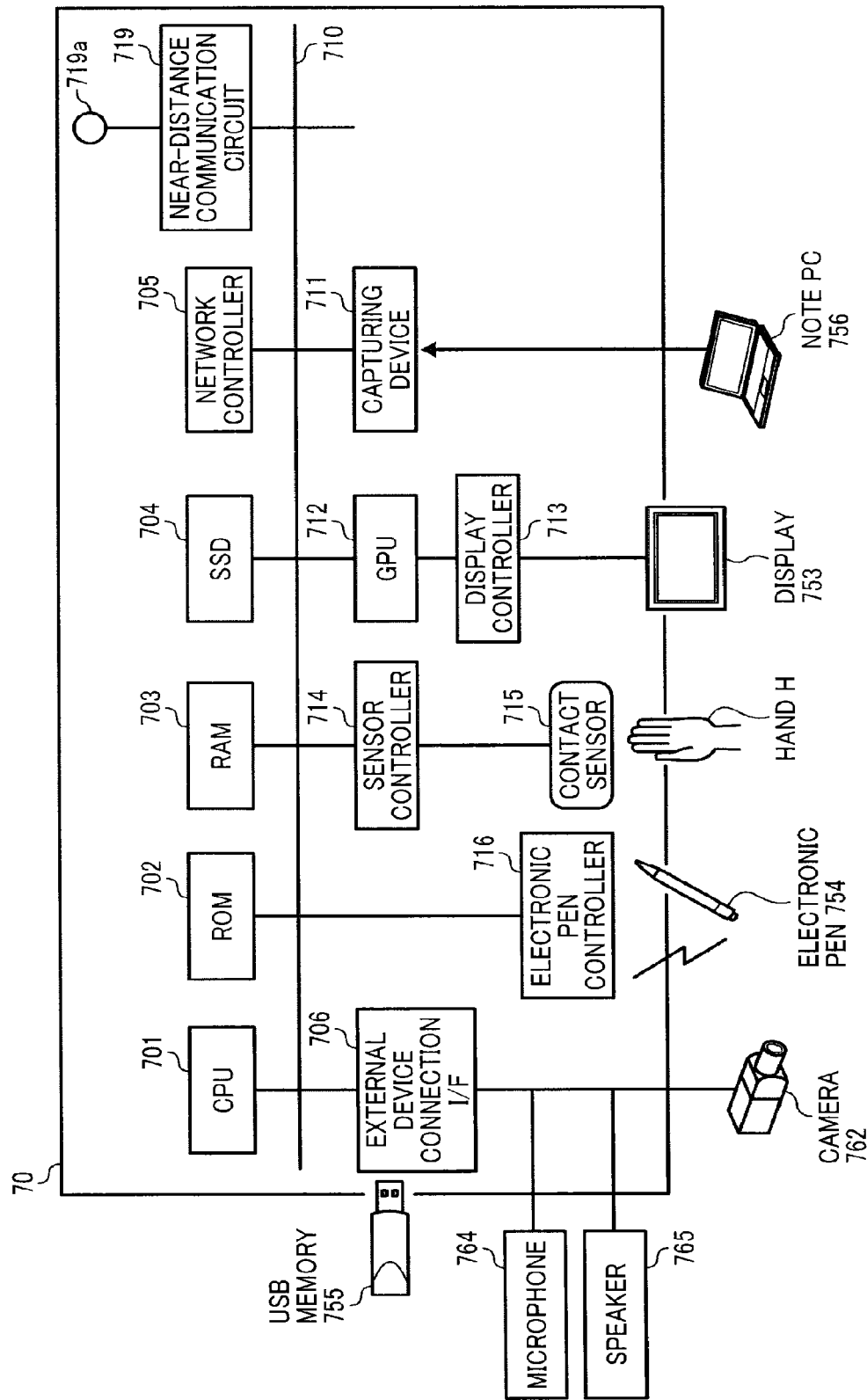
FIG. 4 is a schematic block diagram illustrating a hardware configuration of an electronic whiteboard of the communication system of FIG. 1.

FIG. 4 illustrates a hardware configuration of the communication terminal 70, when implemented by the electronic whiteboard, according to the embodiment. As illustrated in FIG. 4, the electronic whiteboard 70, as an example of communication terminal 70, includes a CPU 701, a ROM 702, a RAM 703, a SSD 704, a network controller 705, and an external device connection I/F 706, which are connected through a bus line 710.

The CPU 701 controls entire operation of the electronic whiteboard 70. The ROM 702 stores a control program for controlling the CPU 701 such as an IPL. The RAM 503 is used as a work area for the CPU 701. The SSD 704 stores various data such as the control program for the electronic whiteboard 70. The network controller 705 controls communication with an external device through the communication network 2. The external device connection I/F 706 controls communication with an external device such as a USB memory 755, and external devices such as a camera 762, a speaker 765, a microphone 764, etc.

The electronic whiteboard 70 further includes a capturing device 711, a graphics processing unit (GPU) 712, a display controller 713, a sensor controller 714, a contact sensor 715, an electronic pen controller 716, a near-distance communication circuit 719, and an antenna 719a for the near-distance communication circuit 719.

The capturing device 711 causes a display of a notebook PC 756 to display a video image or a still image based on image data that is captured by the capturing device 711. In this way, the image being displayed on a display 753 of the electronic whiteboard 70 can be shared with the external display. The GPU 712 is a semiconductor chip dedicated to processing a graphical image. The display controller 713 controls display of an image processed at the GPU 712 for output through the display 753 provided with the electronic whiteboard 70. The contact sensor 715 detects a touch onto the display 753 with an electronic pen 754 or a user's hand H. The sensor controller 714 controls operation of the contact sensor 715. The contact sensor 715 senses a touch input to a specific coordinate on the display 735 using the infrared blocking system. More specifically, the display 753 is provided with two light receiving elements disposed on both upper side ends of the display 753, and a reflector frame. The light receiving elements emit a plurality of infrared rays in parallel to a touch panel of the display 753. The light receiving elements receive lights passing in the direction that is the same as an optical path of the emitted infrared rays, which are reflected by the reflector frame. The contact sensor 715 outputs an identifier (ID) of the infrared ray that is blocked by an object (such as the user's hand) after being emitted from the light receiving elements, to the sensor controller 714. Based on the ID of the infrared ray, the sensor controller 715 detects a specific coordinate that is touched. The electronic pen controller 716 communicates with the electronic pen 754 to detect a touch by the tip or bottom of the pen 754 to the display 753. The near-distance communication circuit 719 is a communication circuit that communicates in compliance with the NFC (Registered Trademark), the Bluetooth (Registered Trademark), and the like.

The bus line 710 is an address bus or a data bus, which electrically connects the elements in FIG. 4 such as the CPU 701.

The contact sensor 715 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 754, the electronic pen controller 716 may also detect a touch by another part of the electronic pen 754, such as a part held by a hand.

Hardware Configuration of Mobile Terminal

Figure 5:
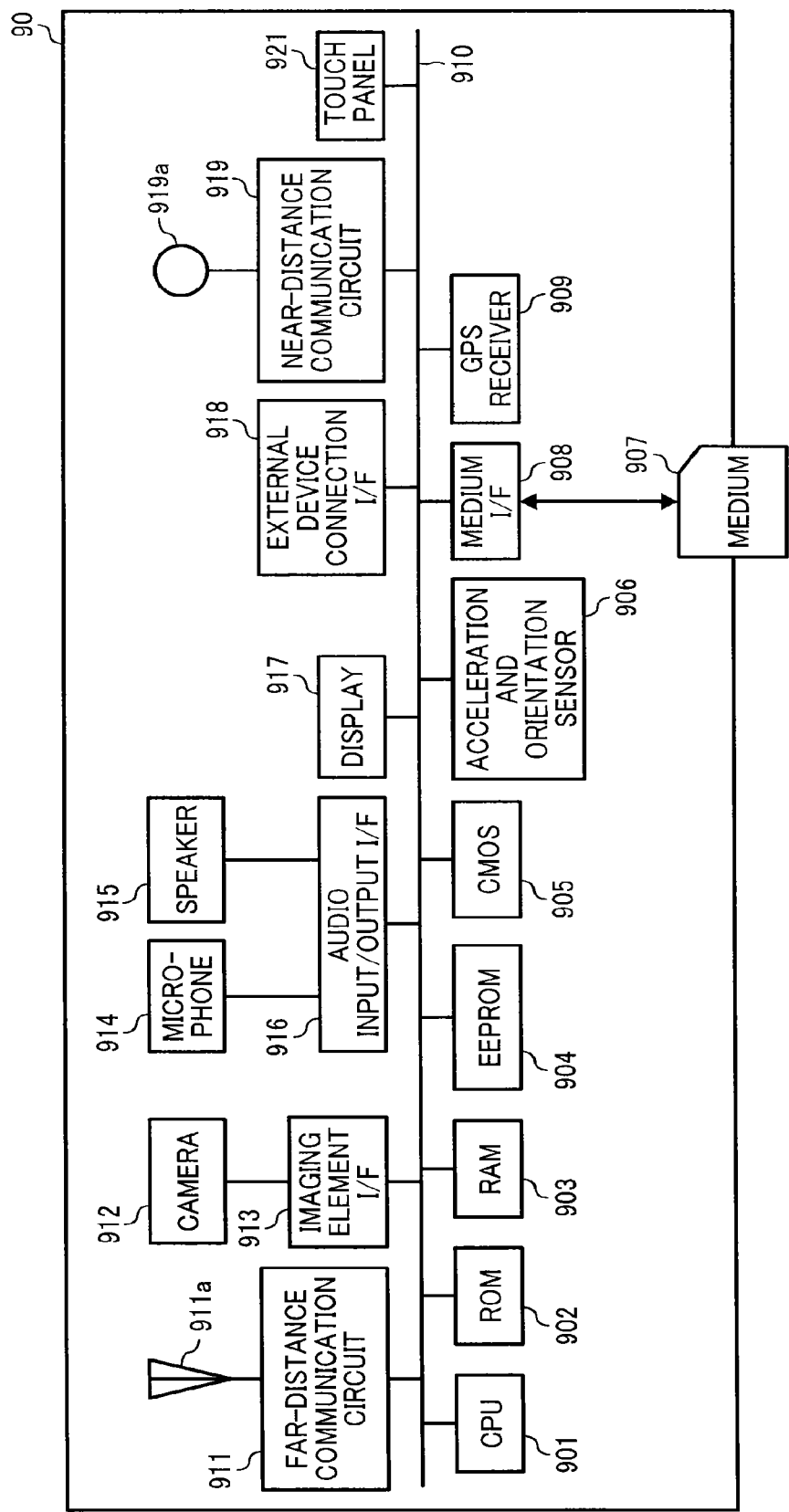
FIG. 5 is a schematic block diagram illustrating a hardware configuration of a mobile terminal of the communication system of FIG. 1.

FIG. 5 illustrates a hardware configuration of a mobile terminal, according to the embodiment of the present invention. As illustrated in FIG. 5, the communication terminal 90, which may be implemented by a mobile terminal such as a smart phone, includes a CPU 901, a ROM 902, a RAM 903, an Electrically Erasable and Programmable ROM (EEPROM) 904, a Complementary Metal Oxide Semiconductor (CMOS) sensor 905, an acceleration and orientation sensor 906, a medium I/F 908, and a GPS receiver 909, which are connected through a bus line 910.

The CPU 901 controls entire operation of the smart phone 90. The ROM 902 stores a control program for controlling the CPU 901 such as an IPL. The RAM 903 is used as a work area for the CPU 901. The EEPROM 904 reads or writes various data such as a communication terminal control program under control of the CPU 901. The CMOS sensor 905 captures an object under control of the CPU 901 to obtain captured image data. The acceleration and orientation sensor 906 includes various sensors such as an electromagnetic compass or gyrocompass for detecting geomagnetism, and an acceleration sensor. The medium I/F 908 controls reading or writing of data with respect to a recording medium 907 such as a flash memory. The GPS receiver 909 receives a GPS signal from a GPS satellite.

The communication terminal 90 further includes a far-distance communication circuit 911, a camera 912, an imaging element I/F 913, a microphone 914, a speaker 915, an audio input/output I/F 916, a display 917, an external device connection I/F 918, a near-distance communication circuit 919, an antenna 919a for the near-distance communication circuit 919, and a touch panel 921.

The far-distance communication circuit 911 is a circuit that communicates with the other device through a communication network 3 such as a mobile communication network. The camera 912 is an example of imaging device capable of capturing a subject under control of the CPU 901, and is incorporated in the communication terminal 90, which is the smart phone. The imaging element device 1/F 913 is a circuit that controls driving of the camera 912. The microphone 914 is an example of audio collecting device capable of inputting audio under control of the CPU 901, and is incorporated in the communication terminal 90. The audio I/O I/F 916 is a circuit for inputting or outputting an audio signal between the microphone 914 and the speaker 915 under control of the CPU 901. The display 915 may be a liquid crystal or organic electro-luminescence (EL) display that displays an image of a subject, an operation icon, or the like. The external device connection I/F 918 is an interface circuit that connects the terminal 90 to various external devices. The near-distance communication circuit 919 is a communication circuit that communicates in compliance with the NFC (Registered Trademark), the Bluetooth (Registered Trademark), and the like. The touch panel 921 is an example of input device that enables the user to input a user instruction through touching a screen of the display 917.

The bus line 910 is an address bus or a data bus, which electrically connects the elements in FIG. 5 such as the CPU 901.

The communication terminal 90 may be implemented by a tablet, a smart watch, portable phone, or portable game machine.

Further, the terminal control program may be recorded in a file in a format installable or executable on a computer-readable recording medium such as the recording medium 907 for distribution. Examples of the recording medium include, but not limited to, a compact disc-recordable (CD-R), digital versatile disc (DVD), blue-ray disc, and SD card.

Software Configuration of Communication Terminal

Figure 6A:
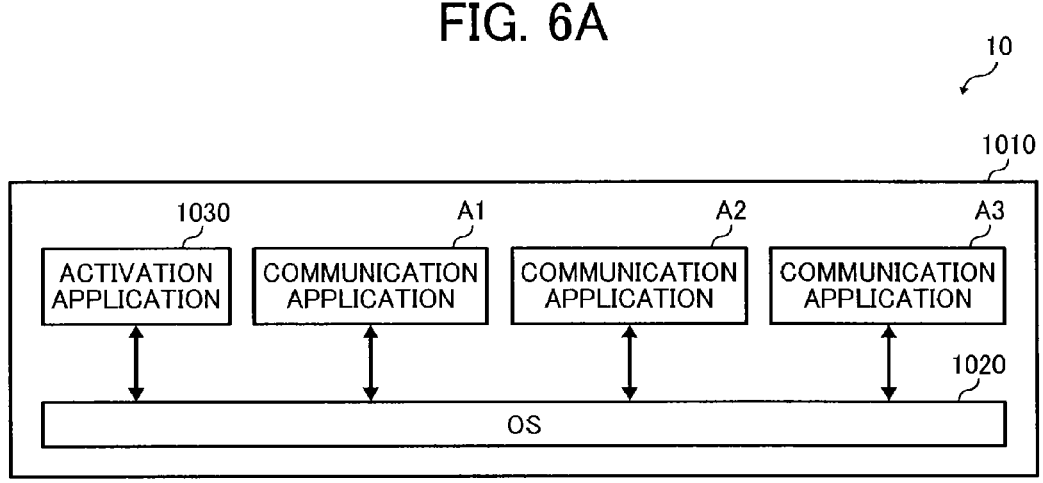
FIG. 6A is a schematic block diagram illustrating a software configuration of the communication terminal as the videoconference terminal according to the embodiment of the invention.

FIG. 6A illustrates a software configuration of the communication terminal 10 as the videoconference terminal according to the embodiment of the invention. As illustrated in FIG. 6A, the communication terminal 10 is installed with an operating system (OS) 1020, activation application 1030, first communication application A1, second communication application A2, and third communication application A3, each of which operates on a work area 1010 of the RAM 103. The OS 1020 is basic software that controls entire operation of the videoconference terminal 10 through providing basic functions. The activation application 1030 activates the system, for example, when the terminal is turned on.

The communication application A1, A2, and A3 each enable the videoconference terminal 10 to communicate with the other communication terminal, using different communication protocols. The communication protocol is defined by, for example, a call control protocol and an image encoding format. Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle. Examples of the image encoding format include, but not limited to, H. 264/SVC, H.264/AVC, and H.265/HEVC.

Figure 6B:
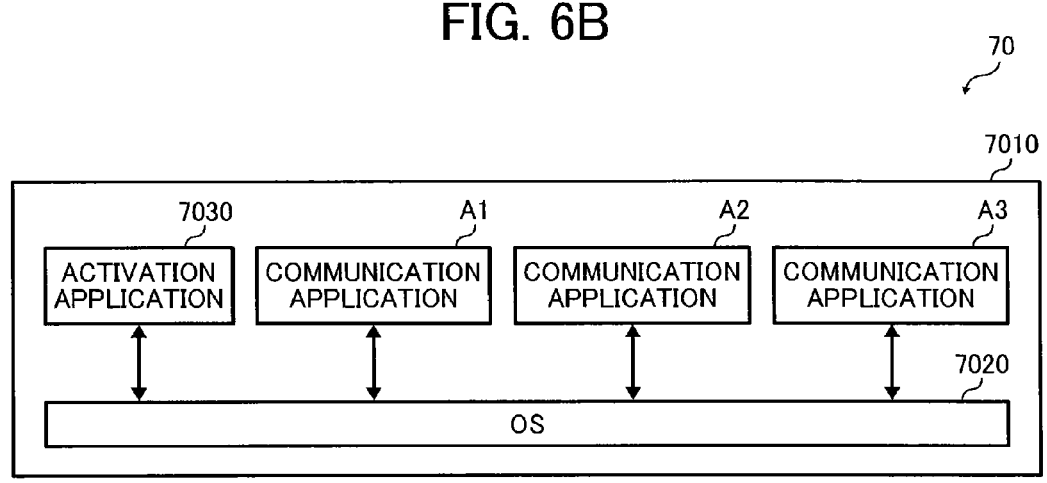
FIG. 6B is a schematic block diagram illustrating a software configuration of the communication terminal as the electronic whiteboard according to the embodiment of the present invention.

FIG. 6B illustrates a software configuration of the communication terminal 70 as the electronic whiteboard according to the embodiment of the invention. As illustrated in FIG. 6B, the communication terminal 70 is installed with an OS 7020, activation application 7030, first communication application A1, second communication application A2, and third communication application A3, each of which operates on a work area 7010 of the RAM 703.

The OS 7020 is basic software that controls entire operation of the electronic whiteboard 70 through providing basic functions. The activation application 7030 activates the system, for example, when the terminal is turned on. The communication application A1, A2, and A3 are the same as the communication A1, A2, and A3 installed with the videoconference terminal 10, respectively. While this example illustrates only three types of communication application being installed, any number (one, two, or more than four) of types of communication application may be installed on any one of the communication terminals.

It is assumed that the OS (1020 or 7020), and the communication application A1, A2, and A3 are installed onto the communication terminal (10 or 70) before shipment to a user side.

Alternatively, application may be added or deleted after shipment, for example, when software (control program) of the communication terminal is updated. More specifically, after being shipped to the user, the communication terminal may access the communication management system 50 or any other server to download the upgraded version, or new, software. Further, the communication terminal may replace the existing software with the new version, or upgraded version, of software (control program) being downloaded. In case of updating the control program, application being installed on the communication terminal such as the communication application A1 to A3 may be upgraded.

Configuration of Communication System

Figure 7:
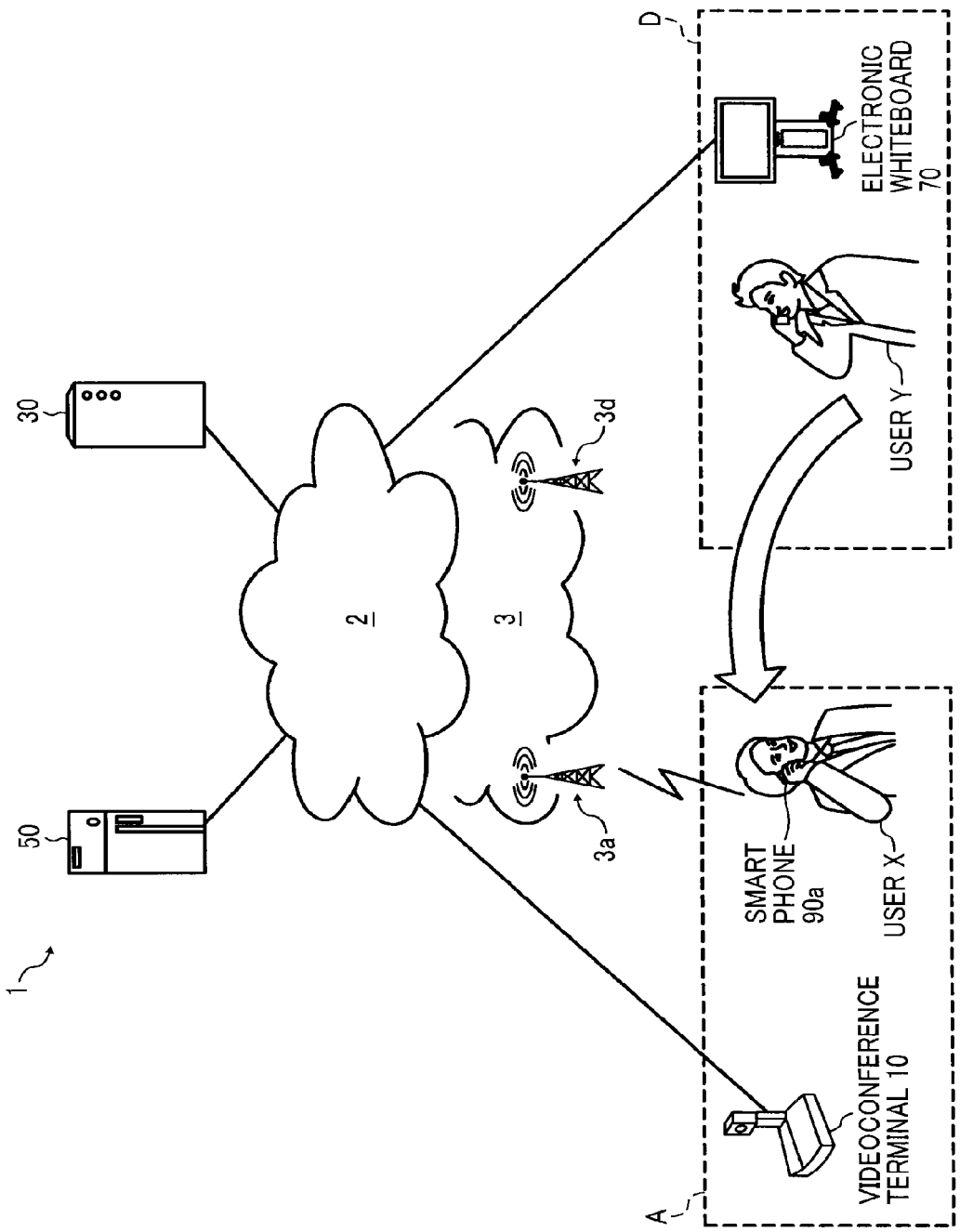
FIG. 7 is a schematic diagram illustrating a network configuration of the communication system of FIG. 1.

Referring now to FIG. 7, a configuration of the communication system 1 is described according to the embodiment. FIG. 7 is a schematic diagram illustrating a network configuration of the communication system 1 of FIG. 1.

In FIG. 7, the communication terminals such as the videoconference terminal 10 and the electronic whiteboard 70, the relay device 30, and the communication management system 50, are connected to the communication network 2 including the Internet. The communication network 2 may include wireless network, in addition to wired network. In this example, the communication terminal 10 is provided at a site A, and the communication terminal 70 is provided at a site D. For example, the site A may be Japan, and the site B may be England. At the site A, a user X has a mobile terminal 90a, which is one example of mobile terminal. The user X also operates the communication terminal 10. At the site D, the user Y operates the communication terminal 70. In this example illustrated in FIG. 7, the user X usually works at the site D (England), but temporarily visits the site A (Japan). In such case, before leaving for the site A, the user X stores information to be used for accessing the communication terminal 70 at the site D, in the mobile terminal 90a. At the site A, the user X operates the communication terminal 10 to communicate with the communication terminal 70, using the information stored in the mobile terminal 90a.

Functional Configuration of Embodiment

Figure 8B:
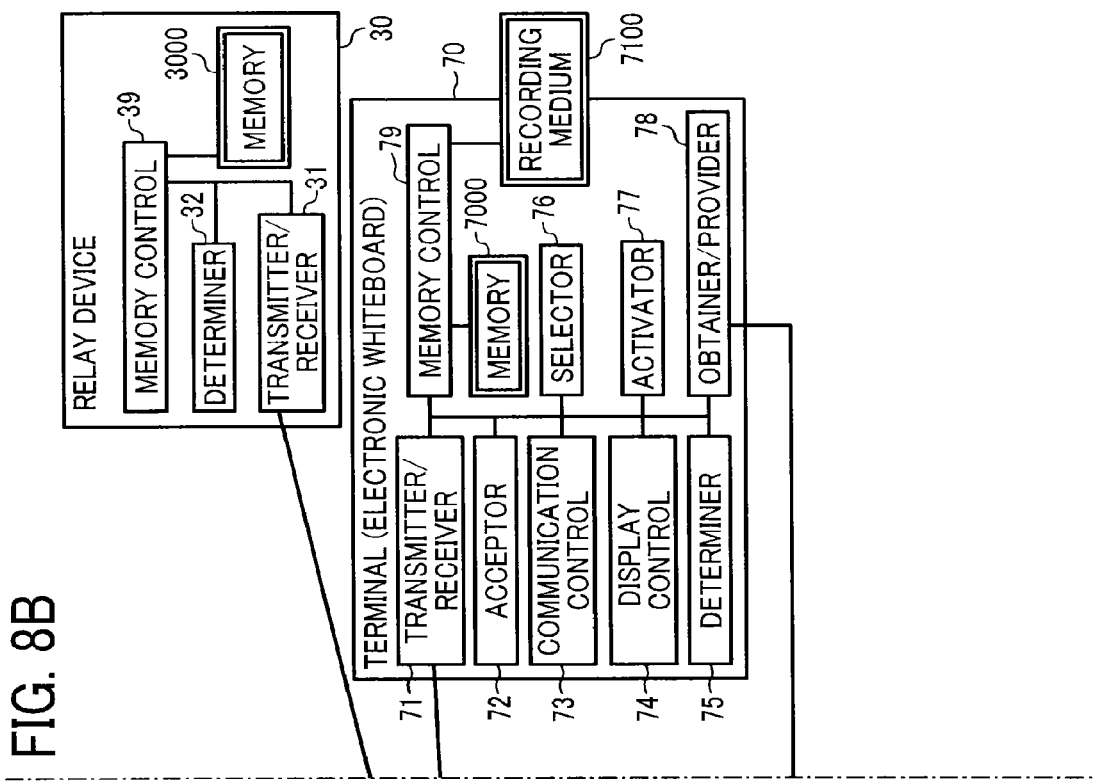

Referring now to FIGS. 2 to 5 and 8, a functional configuration of the communication system 1 of FIG. 1 is described according to the embodiment of the present invention. FIG. 8 is a schematic block diagram illustrating a functional configuration of the communication system 1 of FIG. 1 according to the embodiment of the present invention.

Functional Configuration of Terminal

The terminal 10 includes a transmitter/receiver 11, an acceptor 12, a communication control 13, a display control 14, a determiner 15, a selector 16, an activator 17, an obtainer/provider 18, and a memory control 19. These units are functions that are implemented by or that are caused to function by operating any of the hardware components illustrated in FIG. 2 in cooperation with the instructions of the CPU 101 according to the communication control program expanded from the flash memory 104 to the RAM 103. The communication terminal 10 further includes a memory 1000 configured by the RAM 103 illustrated in FIG. 2, and the flash memory 104 illustrated in FIG. 2. The communication terminal 10 may be provided with a recording medium 1100 that is removable.

Functional Configuration of Communication Terminal

Next, a functional configuration of the communication terminal 10 is described in detail. The transmitter/receiver 11, which may be implemented by the instructions of the CPU 101, the network I/F 111, and the external device connection I/F 118, illustrated in FIG. 2, transmits or receives various data (or information) to or from the other terminal, apparatus, or system through the communication network 2. Before starting communication with a counterpart terminal, the transmitter/receiver 11 starts receiving terminal state information indicating an operating state of each communication terminal as a candidate counterpart terminal, from the communication management system 50. The state information not only indicates the operating state of each communication terminal (whether the communication terminal is online or offline), but also indicates a detailed state such as whether the communication terminal whose state is online is now capable of communicating or is currently communicating, or the user of the communication terminal is not at the communication terminal. Hereinafter, the case in which the state information indicates the operating state will be described by way of example.

The transmitter/receiver 11 further controls processing to start communication between the communication terminal 10 and a counterpart communication terminal such as the communication terminal 70.

The acceptor 12, which is implemented by the instructions of the CPU 101 illustrated in FIG. 2 and by the operation key 108 and the power switch 109 illustrated in FIG. 2, accepts various inputs from the user.

The communication control 13 is implemented by the instructions of the CPU 101, and any desired device relating to input or output of content data. In one example, the communication control 13 is implemented by the instructions of the CPU 101 illustrated in FIG. 2 and by the camera 112 and the imaging element I/F 113 illustrated in FIG. 2. The communication control 13 captures an image of a subject and outputs image data obtained by capturing the image. In one example, the communication control 13 is implemented by the instructions of the CPU 101 illustrated in FIG. 2 and by the audio input/output I/F 116 illustrated in FIG. 2. After the sound of the user is converted to an audio signal by the microphone 114, the communication control 13 receives audio data according to this audio signal. In another example, the communication control 13 is implemented by the instructions of the CPU 101 illustrated in FIG. 2 and by the audio input/output I/F 116 illustrated in FIG. 2, and outputs the audio signal according to the audio data to the speaker 115, and the speaker 115 outputs audio.

The display control 14 is implemented by the instructions of the CPU 101 illustrated in FIG. 2 and by the display I/F 117 illustrated in FIG. 2. The display control 14 combines images of different resolutions and transmits the combined image to the display 120. The display control 14 also transmits information on a contact list, received from the management system 50, to the display 120, and controls display of the contact list on the display 120.

The determiner 15, which may be implemented by the instructions of the CPU 101 illustrated in FIG. 2, determines whether any communication terminal, such as the mobile terminal, is located within a predetermined distance from the communication terminal 10. The selector 16, which may be implemented by the instructions of the CPU 101 according to the activation application 1030 of FIG. 6A, selects communication application to be activated based on the terminal identification information of the counterpart communication terminal.

For example, in case the terminal identification information is a terminal ID, the first communication application A1 is selected. The selector 16 analyzes a description format of the terminal identification information to determine whether it is a sequence of characters and/or marks.

In case the terminal identification information is a terminal IP address, the second communication application A2 is selected. In this example, the terminal IP address may be an IP address, which is used for accessing the counterpart communication terminal. If a description format of the terminal identification information indicates 32-bit numerals with four sets of 8-bit numerals (in case of IPv4), the selector 16 determines that the terminal identification information is the terminal IP address.

In case the terminal identification information is an email address, the third communication application A3 is selected. In this example, the email address is used to identify a communication destination of the communication terminal. The email address is expressed as a string of characters as defined by RFC2822. The selector 16 specifically determines whether a left of the mark "@" is a domain name, and a right of the mark "@" is an email server.

In the above-described embodiment, the communication application A1 is selected in case the terminal identification information is a terminal ID, the communication application A2 is selected in case the terminal identification information is an IP address, and the communication application A3 is selected in case the terminal identification information is an email address. Such combination of a type of the terminal identification information and a type of communication application is determined by a description format of the terminal identification information applicable to the communication application. For this reason, any other combination may be used. For example, other examples of the terminal identification information include a user ID identifying the user operating the counterpart communication terminal, and a user name of the user operating the counterpart communication terminal. In such case, communication application applicable to a description format of the terminal identification information for such user ID or user name is selected. In case none of communication application being installed with the communication terminal (starting terminal) is applicable to the terminal identification information of the counterpart communication terminal, the communication terminal may control its display to display a message indicating that no communication application applicable to the terminal identification information of the counterpart communication terminal is available, or a message requesting a user to install communication application applicable to the terminal identification information of the counterpart communication terminal.

The activator 17, which may be implemented by the instructions of the CPU 101 according to the activation application 1030 of FIG. 6A, activates the communication application selected by the selector 16.

The obtainer/provider 18, which may be implemented by the instructions of the CPU 101, and the near-distance communication circuit 119 with the antenna 119a, illustrated in FIG. 2, communicates with the counterpart communication terminal such as the mobile terminal 90 to transmit (provide) data or receive (obtain) data to or from the counterpart communication terminal.

The memory control 19, which is implemented by the instructions of the CPU 101 and the SSD 105 illustrated in FIG. 2, or by the instructions of the CPU 101, performs processing to store various types of data in the memory 1000 or the recording medium 1100 or to read various types of data stored in the memory 1000 or the recording medium 1100. Further, every time image data and audio data are received in performing communication with a counterpart terminal, the memory 1000 overwrites the image data and audio data. The display 120 displays an image based on image data before being overwritten, and the speaker 115 outputs audio based on audio data before being overwritten. The recording medium 1100 is implemented by the recording medium 106 illustrated in FIG. 2.

Note that the terminal identification information in the embodiment is an example of identification information that is used to uniquely identify a specific communication terminal (10, 70) or the user operating such terminal, such that a language, a character(s), a symbol(s), or various marks are not limited to the above-described embodiment. For example, a combination of at least two of the above-mentioned language, character(s), symbol(s), and various marks may be used as the terminal identification information. Further, the user ID may include a name of the user, the individual number that uniquely assigns each user such as a social security number, etc.

Functional Configuration of Relay Device

The relay device 30 includes a transmitter/receiver 31, a determiner 32, and a memory control 39. These units are functions that are implemented by or that are caused to function by operating any of the elements illustrated in FIG. 3 in cooperation with the instructions of the CPU 501 according to the relay device control program expanded from the HD 504 to the RAM 503. The relay device 30 also includes a memory 3000 implemented by the RAM 504 illustrated in FIG. 3 and/or the HD 504 illustrated in FIG. 3.

Functional Configuration of Relay Device

Next, a functional configuration of the relay device 30 is described in detail. In the following description of functional configuration of the relay device 30, relationships of the hardware elements in FIG. 3 with the functional configuration of the relay device 30 in FIG. 8 will also be described.

The transmitter/receiver 31 of the relay device 30 illustrated in FIG. 8, which is implemented by the instructions of the CPU 501 illustrated in FIG. 3 and by the network I/F 509 illustrated in FIG. 3, transmits or receives various types of data (or information) to or from another terminal, device, or system via the communication network 2. The transmitter/receiver 31 also serves as a transferer, which transfers content data transmitted from one communication terminal (such as the communication terminal 10) to another communication terminal (such as the communication terminal 70).

The determiner 32, which may be implemented by the instructions of the CPU 501 illustrated in FIG. 3, determines delay of data transmission.

The memory control 39, which may be implemented by the instructions of the CPU 501 illustrated in FIG. 3 and the HDD 505 illustrated in FIG. 3, performs processing to store various types of data in the memory 3000 or read various types of data stored in the memory 3000.

Functional Configuration of Management System

The communication management system 50 includes a transmitter/receiver 51, a determiner 52, and a memory control 59. These units are functions that are implemented by or that are caused to function by operating any of the elements illustrated in FIG. 8 in cooperation with the instructions of the CPU 501 according to the communication management program expanded from the HD 504 to the RAM 503. In addition, the communication management system 50 includes a memory 5000 implemented by the HD 504 illustrated in FIG. 3.

Authentication Management Table

FIG. 9 is an illustration of an example data structure of an authentication management table. The memory 5000 stores an authentication management DB 5001 such as the authentication management table illustrated in FIG. 9. The authentication management table stores, for each one of the terminals (10, 70) managed by the communication management system 50, the terminal ID and the password in association with each other. For example, the authentication management table illustrated in FIG. 9 indicates that the terminal ID of the terminal 10*aa* is "01*aa*", and the password of the terminal 10*aa* is "aaaa".

Terminal Management Table

FIG. 10 is an illustration of an example data structure of a terminal management table. The memory 5000 stores a terminal management DB 5002 such as the terminal management table illustrated in FIG. 10. The terminal management table stores, for each one of the terminals (such as the communication terminals 10 and 70) managed by the communication management system 50, the terminal ID of the terminal, a counterpart terminal name in the case where the terminal serves as a counterpart terminal, the operating state of the terminal, a date/time received at which login request information described later is received at the communication management system 50, and the IP address of the terminal, in association with one another. For example, the terminal management table illustrated in FIG. 10 indicates that the terminal 10*aa* with the terminal ID "01*aa*" has the counterpart terminal name "AA terminal, Tokyo office, Japan", the operating state "online (communication OK)", the date/time received at which login request information is received by the management system 50 "Apr. 10, 2015, 13:40", and the IP address "1.2.1.3". The terminal ID, the terminal (counterpart) name, and the terminal IP address in the terminal management table of FIG. 10 is registered by the communication management system 50, when the communication management system 50 accepts registration of each communication terminal (10, 70) that requests services from the communication management system 50.

Contact List Management Table

FIG. 11 is an illustration of an example data structure of a contact list management table. The memory 5000 further stores a contact list management DB 5003 implemented by the contact list management table illustrated in FIG. 11. The contact list management table stores, for each one of the terminals managed by the communication management system 50, the terminal ID of the terminal (starting terminal) that requests to start communication, in association with the terminal IDs of all counterpart terminals registered as candidate counterpart terminals for the starting terminal. For example, the contact list management table illustrated in FIG. 11 indicates that candidates for a counterpart terminal to which a starting terminal (terminal 10*aa*) whose terminal ID is "01*aa*" can send a request to start communication in a videoconference are the terminal 10*ab* whose terminal ID is "01*ab*", the terminal 10*ba* whose terminal ID is "01*ba*", the terminal 70*bb* whose terminal ID is "07*bb*", and so forth. Note that the terminal 70*bb* is one example of the communication terminal 70, as the electronic whiteboard 70 in FIG. 7. The candidate counterpart terminals are updated by addition or deletion in response to an addition or deletion request received from an arbitrary terminal (starting terminal) to the management system 50.

The contact list is just one example of contact information indicating a candidate of counterpart communication terminals, such that the contact information may be managed in various ways other than in the form of contact list, as long as the counterpart terminal information is associated with the starting terminal.

Addition Request Management Table

FIG. 12 is an illustration of an example data structure of an addition request management table. The memory 5000 stores an addition request management DB 5004 such as the addition request management table illustrated in FIG. 12. The addition request management table stores information regarding an addition request that requests to add a terminal as a candidate counterpart terminal for a terminal. The addition request management table stores, for each addition request, a terminal ID of the communication terminal that sends the addition request ("request sender terminal"), and a terminal ID of the communication terminal that is requested to be added ("request destination terminal"), in association with each other.

Functional Configuration of Management System

Next, referring back to FIG. 7, a functional configuration of the communication management system 50 will be described in detail. In the following description of a functional configuration of the communication management system 50, relationships of the hardware configuration of FIG. 3 with a functional configuration of the management system 50 in FIG. 7 will also be described.

The transmitter/receiver 51, which is implemented by the instructions of the CPU 501 illustrated in FIG. 3 and by the network I/F 509 illustrated in FIG. 3, transmits or receives various types of data (or information) to or from another terminal, device, or system via the communication network 2.

The determiner 15, which may be implemented by the instructions of the CPU 501 illustrated in FIG. 3, outputs a determination result.

The memory control 59, which may be implemented by the instructions of the CPU 501 illustrated in FIG. 3 and the HDD 505 illustrated in FIG. 3, performs processing to store various types of data in the memory 5000 or read various types of data stored in the memory 5000.

Functional Configuration of Communication Terminal

The communication terminal 70 includes a transmitter/receiver 71, an acceptor 72, a communication control 73, a display control 74, a determiner 75, a selector 76, an activator 77, an obtainer/provider 78, and a memory control 79. These units are functions that are implemented by or that are caused to function by operating any of the elements illustrated in FIG. 4 in cooperation with the instructions of the CPU 701 according to the communication control program expanded from the SSD 704 to the RAM 703. The communication terminal 70 further includes a memory 7000 configured by the RAM 703 illustrated in FIG. 4, and the SSD 704 illustrated in FIG. 4. The communication terminal 70 may be provided with a recording medium 7100 that is removable.

Functional Configuration of Communication Terminal

Next, a functional configuration of the communication terminal 70 is described in detail. The transmitter/receiver 71, which may be implemented by the instructions of the CPU 701, the network controller 705, and the external device connection I/F 706, illustrated in FIG. 4, transmits or receives various data (or information) to or from the other terminal, apparatus, or system through the communication network 2. Before starting communication with a counterpart terminal, the transmitter/receiver 71 starts receiving terminal state information indicating an operating state of each communication terminal as a candidate counterpart terminal, from the communication management system 50. The state information not only indicates the operating state of each communication terminal (whether the communication terminal is online or offline), but also indicates a detailed state such as whether the communication terminal whose state is online is now capable of communicating or is currently communicating, or the user of the communication terminal is not at the communication terminal. In addition, the state information not only indicates the operating state of each terminal, but also indicates various states, such as the state that the cable 120c is disconnected from the terminal, the state that the terminal can output sounds but not images, or the state that the terminal is muted. Hereinafter, the case in which the state information indicates the operating state will be described by way of example.

The transmitter/receiver 71 further controls processing to start communication with the other communication terminal such as the counterpart communication terminal 10. The acceptor 72, which is implemented by the instructions of the CPU 701, the contact sensor 715, and the electronic pen controller 716, illustrated in FIG. 4, accepts various inputs from the user.

The communication control 73 is implemented by the instructions of the CPU 701, in cooperation with any desired device relating to input or output of content data. In one example, the communication control 13 applies image processing to an image captured by the camera 762. In another example, the communication control 73, after the audio of the user is converted to an audio signal by the microphone 764, the communication control 13 processes audio data based on this audio signal. In another example, the communication control 73 outputs the audio signal according to the audio data to the speaker 765, and the speaker 765 outputs audio.

In another example, the communication control 73 obtains drawing data, drawn by the user with the electronic pen 754 or the user's hand H onto the display 753, and converts the drawing data to coordinate data. Further, when the communication terminal 70 transmits the coordinate data to the other communication terminal 70, the other communication terminal causes the display 753 to display drawing data based on the coordinate data received from the communication terminal 70.

The display control 74 is implemented by the instructions of the CPU 701 illustrated in FIG. 4 and by the display controller 713 illustrated in FIG. 4. The display control 74 combines images of different resolutions and transmits the combined image to the display 753. The display control 74 also transmits information on a contact list, received from the communication management system 50, to the display 753, and controls display of the contact list on the display 753.

The determiner 75, which may be implemented by the instructions of the CPU 701 illustrated in FIG. 4, determines whether any communication terminal, such as the mobile terminal 90, is within a predetermined distance from the communication terminal 70.

The activator 77, which may be implemented by the instructions of the CPU 701 according to the activation application 7030 of FIG. 6B, activates the communication application selected by the selector 76. The selector 76 selects the communication application to be activated, from the communication application A1, A2, and A3 of FIG. 6B, in a substantially similar manner as described above for the case of the selector 16 of the communication terminal 10.

The obtainer/provider 78, which may be implemented by the instructions of the CPU 701, the near-distance communication circuit 719 with the antenna 719*a*, illustrated in FIG. 4, communicates with the counterpart communication terminal to transmit (provide) data or receive (obtain) data to or from the counterpart communication terminal.

The memory control 79, which is implemented by the instructions of the CPU 701 and the SSD 704 illustrated in FIG. 4, or by the instructions of the CPU 701, performs processing to store various types of data in the memory 7000 or the recording medium 7100 or to read various types of data stored in the memory 7000 or the recording medium 7100. Further, every time image data and audio data are received in performing communication with a counterpart terminal, the memory 7000 overwrites the image data and audio data. The display 753 displays an image based on image data before being overwritten, and the speaker 765 outputs audio based on audio data before being overwritten. The recording medium 7100 is implemented by the USB memory 755 illustrated in FIG. 4.

Functional Configuration of Communication Terminal

The functional configuration of the communication terminal 90*a* is described as an example.

The mobile terminal 90*a* includes a transmitter/receiver 91*a*, an acceptor 92*a*, a communication control 93*a*, a display control 94*a*, a determiner 95*a*, an obtainer/provider 98*a*, and a memory control 99*a*. These units are functions that are implemented by or that are caused to function by operating any of the hardware elements illustrated in FIG. 5 in cooperation with the instructions of the CPU 901 according to the communication control program expanded from the EEPROM 904 to the RAM 903. The communication terminal 90*a* further includes a memory 9000*a* configured by the RAM 903 illustrated in FIG. 5, and the EEPROM 704 illustrated in FIG. 5. The communication terminal 90*a* may be provided with a recording medium 9100*a* that is removable.

Functional Configuration of Mobile Terminal

Next, a functional configuration of the mobile terminal 90*a* is described in detail. The transmitter/receiver 91*a*, which may be implemented by the instructions of the CPU 901, and the near-distance communication circuit 911 with the antenna 911*a*, illustrated in FIG. 5, transmits or receives various data (or information) to or from the other terminal, apparatus, or system through the communication network 3.

The acceptor 92*a*, which is implemented by the instructions of the CPU 901 illustrated in FIG. 5 and by the touch panel 921 illustrated in FIG. 5, accepts various inputs from the user.

The communication control 93*a* is implemented by the instructions of the CPU 901 in cooperation with any desired device relating to input or output of content data. In one example, the communication control 93*a*, implemented by the instructions of the CPU 901 in cooperation with the imaging element I/F 913, applies image processing to an image captured by the camera 912. In another example, the communication control 93*a* is implemented by the instructions of the CPU 901 in cooperation with the audio input/output I/F 916. After the audio of the user is converted to an audio signal by the microphone 914, the communication control 93*a* processes audio data based on this audio signal. In another example, the communication control 93*a*, implemented by the instructions of the CPU 901 and the audio input/output I/F 916, outputs the audio signal according to the audio data to the speaker 915, and the speaker 915 outputs audio.

The display control 94*a*, which may be implemented by the instructions of the CPU 901, controls display of an image based on the image data through the display 917.

The determiner 95*a*, which may be implemented by the instructions of the CPU 901 illustrated in FIG. 5, outputs a determination result.

The obtainer/provider 98*a*, which may be implemented by the instructions of the CPU 901, and the near-distance communication circuit 919 with the antenna 919*a*, illustrated in FIG. 5, communicates with the counterpart communication terminal to transmit (provide) data or receive (obtain) data to or from the counterpart communication terminal.

The memory control 99*a*, which may be implemented by the instructions of the CPU 901 and the EEPROM 904, illustrated in FIG. 5, performs processing to store various types of data in the memory 9000*a* or 9100*a* or read various types of data stored in the memory 9000*a* or 9100*a*.

Data Structure of Near-Distance Communication Circuit

FIG. 13 illustrates a data structure of a near-distance communication circuit. The near-distance communication circuit 919 has a data structure as illustrated in FIG. 13. With this data structure, the near-distance communication circuit 919 manages data by block number. For instance, a storage area with the block No. 1 stores an identifier of the near-distance communication circuit 919, and a storage area with the block No. 2 stores a user name of the mobile terminal 90 having the near-distance communication circuit 919.

The storage areas with the block Nos. 3 to 5 are each for storing the terminal identification information of the communication terminal 10 or 70, which is obtained by the mobile terminal 90 by near-distance communication. The storage areas with the block Nos. 3, 4, and 5 respectively correspond to the terminal ID, the IP address, and the email address. For example, if the terminal ID "07*db*" is obtained at the mobile terminal 90*a* as the terminal identification information of the communication terminal 70, the near-distance communication circuit 919 of the mobile terminal 90*a* stores the terminal ID "07*db*" in the storage area with the block No. 3.

The storage areas with the block Nos. 6 to 8 are each for storing the terminal identification information of the communication terminal 10 or 70, which is received at the local mobile terminal 90 from the counterpart mobile terminal 90 via the communication network 3. The storage areas with the block Nos. 6, 7, and 8 respectively correspond to the terminal ID, the IP address, and the email address.

Operation

Referring to FIGS. 14 to 22, operation performed by the communication system 1 is explained according to an embodiment of the present invention. In this following example, it is assumed that the user X (Kato) at the site A requests to have a videoconference with the user Y (James) at the site D. More specifically, the user X at the site D obtains the terminal ID of the communication terminal 70, for example, by bringing the mobile terminal 90a close to the communication terminal 70. After moving to the site A, the user X brings the mobile terminal 90a, which stores the terminal ID of the communication terminal 70, close to the communication terminal 10 to send the terminal ID of the communication terminal 70 to the communication terminal 10. The communication terminal 10, which receives the terminal ID of the communication terminal 70, can then start videoconference with the communication terminal 70 via the communication network 2. Before calling with the communication terminal 10, the user X at the site A may call a mobile terminal of the user Y.

Figure 14:
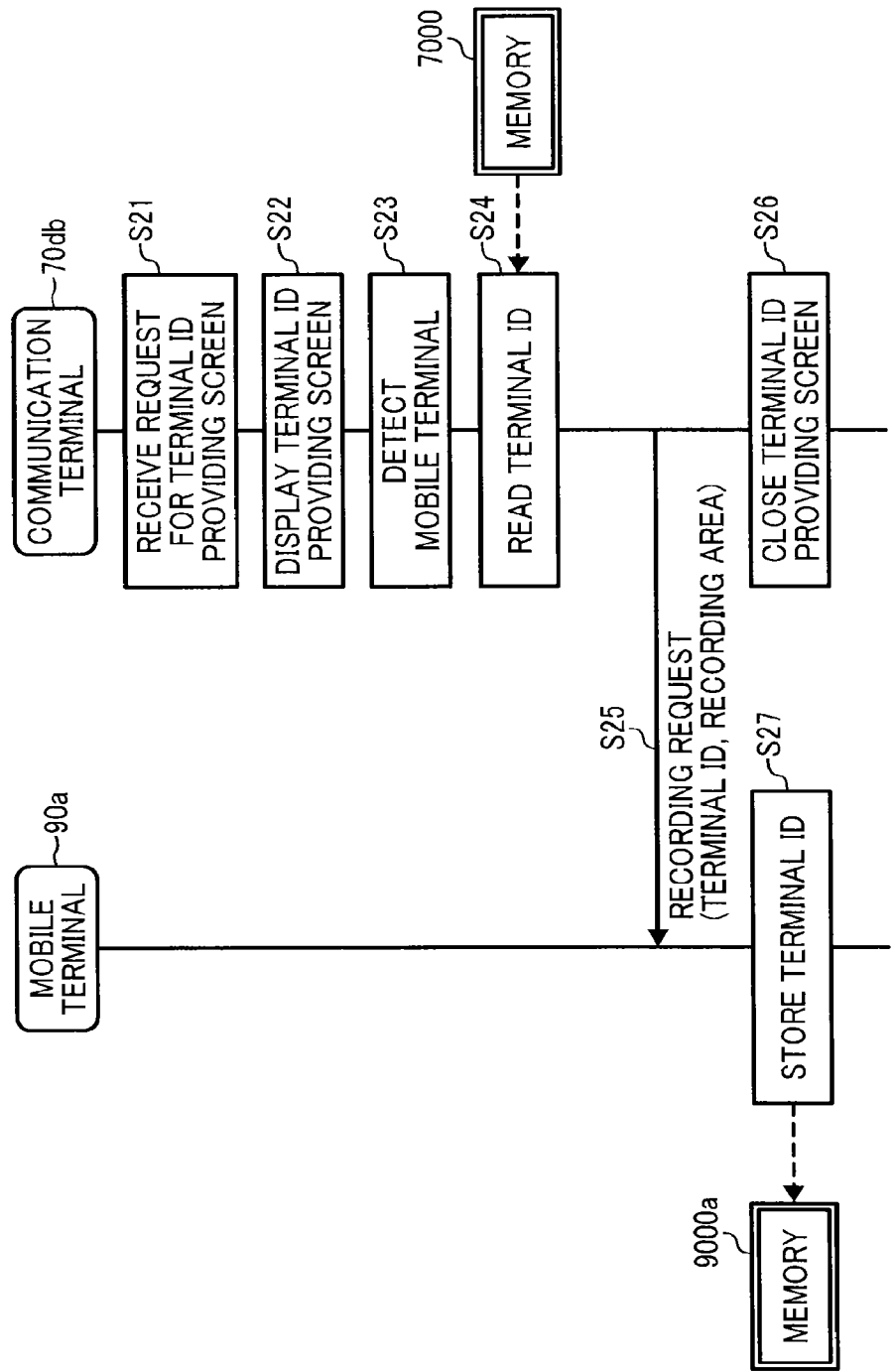
FIG. 14 is a data sequence diagram illustrating operation of providing terminal identification information, performed by the communication terminal of FIG. 1, according to an embodiment of the present invention.
Figure 15:
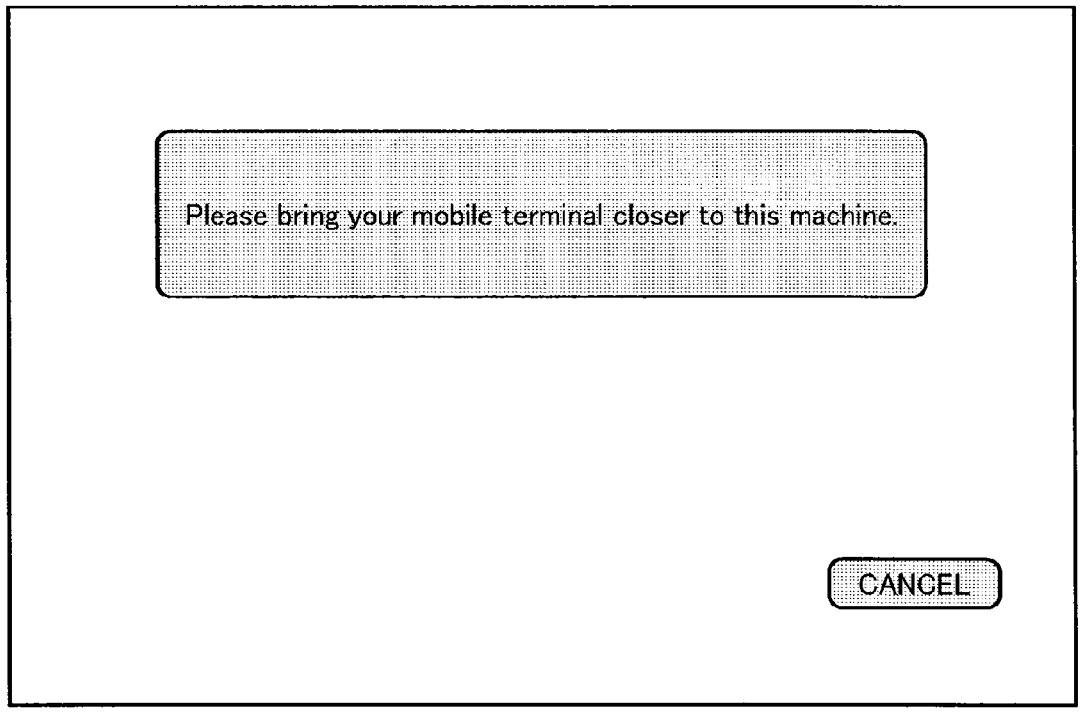
FIG. 15 is an illustration of an example screen for display in providing the terminal identification information.

The communication terminal 70db is one example of the communication terminal 70, which is located at the site D to be operated by the user Y to start videoconference. FIG. 14 is a data sequence diagram illustrating operation of providing the terminal identification information. FIG. 15 is a screen to be displayed in providing the terminal identification information. In this example, the terminal ID is used as the terminal identification information of the communication terminal 70db.

As the user X at the site D operates the communication terminal 70db with the electronic pen 754 or the user's hand H, the acceptor 72 of the communication terminal 70db accepts an instruction for displaying a terminal identification information providing screen (S21). The display control 74 causes the display 753 to display the providing screen as illustrated in FIG. 15 (S22).

The determiner 75 determines whether the mobile terminal 90a is brought sufficiently close to the communication terminal 70db (S23). The following assumes the case in which the user X brings the mobile terminal 90a close to the communication terminal 70db.

The memory control 79 of the communication terminal 70db reads out the terminal ID of the communication terminal 70db from the memory 7000 (S24).

The obtainer/provider 78 transmits a request for recording the terminal ID ("recording request") to the mobile terminal 90a by near-distance wireless communication (S25). The recording request includes the terminal ID that is read at S24, and recording area indicating an area where such terminal ID is to be recorded. The obtainer/provider 98 of the mobile terminal 90a receives the recording request. The obtainer/provider 98 obtains the terminal ID and the recording area information. The memory control 99a stores the terminal ID in the memory 9000a, as indicated by the recording area information (S27). For example, as illustrated in FIG. 13, the terminal ID of the communication terminal 70db is stored in an area identified with the block No. 3. In the meantime, after transmitting the recording request at S25, the display control 74 of the communication terminal 70db closes the providing screen (S26).

Figure 16B:
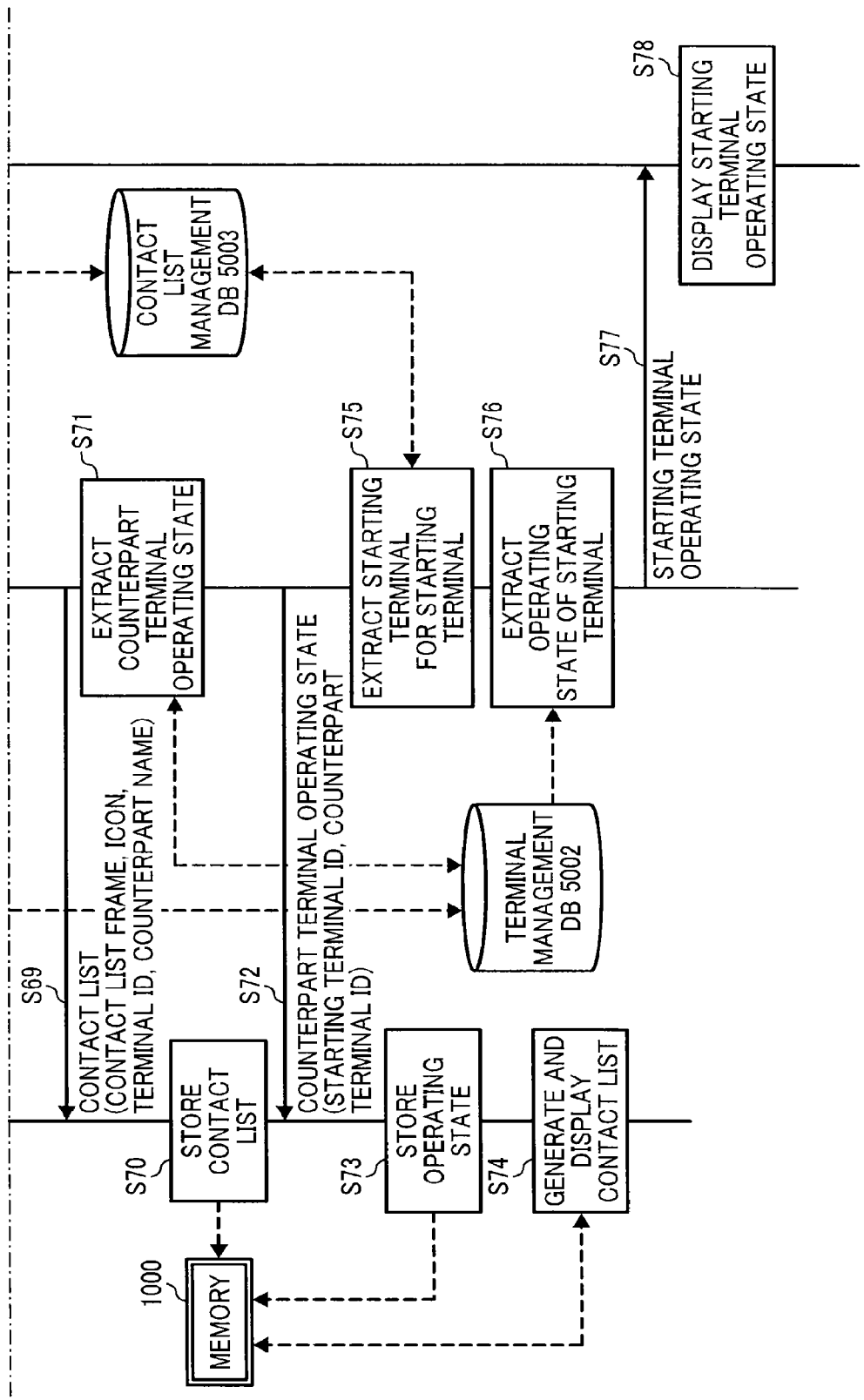

Referring to FIGS. 16 and 17, operation of preparing for communication between the communication terminal 10aa and the communication terminal 10ab is explained according to an embodiment of the present invention. FIG. 16 is a data sequence diagram illustrating operation of preparing for communication between the terminal 10aa and the terminal 10ab. FIG. 17 is an example screen of a contact list for display at the terminal 10aa.

In this example, the communication terminal 10aa corresponds to the communication terminal 10 of FIG. 7. The communication terminal 10ab is also a videoconference terminal, which can be a counterpart terminal for the communication terminal 10aa. For simplicity, in FIG. 16, only the communication terminal 10aa and the communication terminal 10ab, which are communicable via the communication management system 50, are illustrated.

First, when the user X presses the operation key 108 illustrated in FIG. 2 to request for activation of the activation application 1030, the acceptor 12 of the terminal 10aa accepts a request for activating the activation application 1030, and activates the activation application 1030 (S61). The transmitter/receiver 11 of the terminal 10aa transmits login request information indicating a login request to the communication management system 50 via the communication network 2 (S62). The login request information includes a terminal ID for identifying the terminal 10aa, which is a local terminal serving as a starting terminal, and a password. The terminal ID and the password are data that have been read via the memory control 19 from the memory 1000 and sent to the transmitter/receiver 11.

Next, the memory control 59 of the management system 50 performs terminal authentication by searching the authentication management table of FIG. 9 using the terminal ID and the password included in the login request information received via the data transmitter/receiver 51 as search keys, and determining whether the same terminal ID and the same password are managed in the authentication management table of FIG. 9 (S63). In the case where the memory control 59 determines that the login request is a login request received from the authenticated terminal since the same terminal ID and the same password are managed, the memory control 59 stores, in a record for the terminal ID received at S62 in the terminal management table of FIG. 10, the operating state (Online (communication OK), and the date/time received at which the above-described login request information is received. For example, if the terminal 10aa has the terminal ID "01aa", the memory control 59 stores the operating state "Online (Communication OK)" and the date/time received "Apr. 10, 2015. 13:40" in association with the terminal ID "01aa" in the terminal management table illustrated in FIG. 10. Further, in this example, the terminal 10aa may transmit the IP address of the terminal 10aa to the management system 50 (S62). Alternatively, the terminal IP address may be previously registered in the terminal management table in association with the terminal ID.

The transmitter/receiver 51 of the management system 50 transmits authentication result information indicating an authentication result obtained by the memory control 59 to the starting terminal 10aa which has sent the above-mentioned login request, via the communication network 2 (S65). In the following, the case in which it has been determined by the memory control 59 that the terminal 10aa is a terminal that has a legitimate use authority will be described as follows.

As the terminal 10aa, which is the starting terminal, receives the authentication result information indicating that the terminal 10aa is an authenticated terminal at the transmitter/receiver 11, the transmitter/receiver 11 of the terminal 10aa transmits contact list request information that requests for contact list to the management system 50 through the communication network 2 (S66). The transmitter/receiver 51 of the management system 50 receives the contact list request information.

The memory control 59 of the management system 50 searches the contact list management table (FIG. 11) using the terminal ID of the starting terminal 10aa which has sent the login request as a search key, to extract the terminal ID of a candidate counterpart terminal that can communicate with the starting terminal 10aa. The memory control 59 of the management system 50 further reads out the terminal name associated with the extracted terminal ID from the terminal management table (FIG. 10) (S67). In this example, the terminal IDs (such as "01ab" . . . ) and the terminal names (such as "Japan Osaka Office AB Terminal") of the terminals 10ab . . . , as a counterpart terminal for the starting terminal 10aa, are extracted from the contact list management table (FIG. 11) and the terminal management table (FIG. 10).

The memory control 59 of the communication management system 50 reads contact list frame data, and icon data reflecting the operating state of each candidate counterpart terminal that is read, from the memory 5000 (S68). The transmitter/receiver 51 further transmits the contact list information to the starting terminal 10aa (S69). The contact list information includes the contact list frame data, and the icon data, the terminal ID, and the terminal name of each candidate counterpart terminal 10. The starting terminal 10aa, which receives the contact list information at the transmitter/receiver 11, stores the received contact list information in the memory 1000 via the memory control 19 (S70).

As described above, in this embodiment, instead of managing contact list information at each communication terminal, the management system 50 centrally manages contact list information for all of the terminals 10. In this way, even when a communication terminal is newly added or the existing communication terminal is replaced with a different type of communication terminal, or even when contact list frame is changed, the communication management system 50 can centrally reflect such change without requiring each communication terminal to reflect such change.

Still referring to FIG. 16, the memory control 59 of the management system 50 searches the terminal management table (FIG. 10) using the extracted terminal IDs (10ab . . . ) of the candidate counterpart terminals (10ab . . . ), as search keys, to obtain the operating states of the candidate counterpart terminals (S71).

Next, the transmitter/receiver 51 of the management system 50 transmits counterpart terminal state information including the terminal IDs serving as the search keys used at S67 and the operating states of the counterpart terminals corresponding to these terminal IDs to the starting terminal 10aa via the communication network 2 (S72).

The starting terminal 10aa stores the terminal state information, which may be received from the management system 50 sequentially or at once, in the memory 1000 (S73). Based on the terminal state information received for each candidate counterpart terminal, the starting terminal 10aa is able to know the current operating state of each candidate counterpart terminal such as the operating state of the communication terminal 10ab.

Based on the contact list information and the terminal state information stored in the memory 1000, the display control 14 of the starting terminal 10aa generates a contact list that reflects the current operating state of each candidate counterpart terminal. The display control 14 further displays the contact list on the display 120 of FIG. 2, as illustrated in FIG. 17 (S74). In FIG. 17, the icons each reflecting the operating state of the corresponding terminal are displayed at left. More specifically, the icons in FIG. 17 indicate the operating states of "online (communication OK)", "offline", "online (communication OK)", and "online (communicating), from the top to the bottom.

The memory control 59 of the management system 50 further searches the contact list management table of FIG. 11 using the terminal ID "01aa" of the starting terminal 10aa which has sent the login request as a search key, to extract the terminal ID of another starting terminal that registers the terminal ID "01aa" of the starting terminal 10aa as a candidate counterpart terminal (S75). In the candidate list management table illustrated in FIG. 11, the terminal IDs of other starting terminals that are extracted are "01ab", "01ba", and "07db".

Next, the memory control 59 of the management system 50 searches the contact list management table (FIG. 10) using the terminal ID of the starting terminal 10aa which has sent the login request as a search key, and obtains the operating state of the starting terminal 10aa (S76).

The transmitter/receiver 51 transmits counterpart terminal state information including the terminal ID "01aa" and the operating state "Online (Communication OK)" of the starting terminal 10aa, obtained at S76, to terminals (10ab and 70db) whose operating states are "Online (Communication OK)" in the terminal management table (FIG. 10), among the terminals (10ab, 10ba, and 70db) having the terminal IDs ("01ab", "01ba", and "07db") extracted at S75 (S77). When transmitting the counterpart terminal state information to the terminals (10ab and 70db), the transmitter/receiver 51 refers to the IP addresses of the terminals, which are managed in the terminal management table illustrated in FIG. 10, using the terminal IDs ("01ab" and "07db"). Accordingly, the terminal ID "01aa" and the operating state "online" of the starting terminal (terminal 10aa) which has sent the login request can be transmitted to other counterpart terminals (terminals 10ab and 70db) that can communicate with the starting terminal (terminal 10aa). Accordingly, the candidate counterpart terminal 10 (such as the terminal 10ab) is able to display the contact list with the operating state information as illustrated in FIG. 16 (S78).

Figure 18:
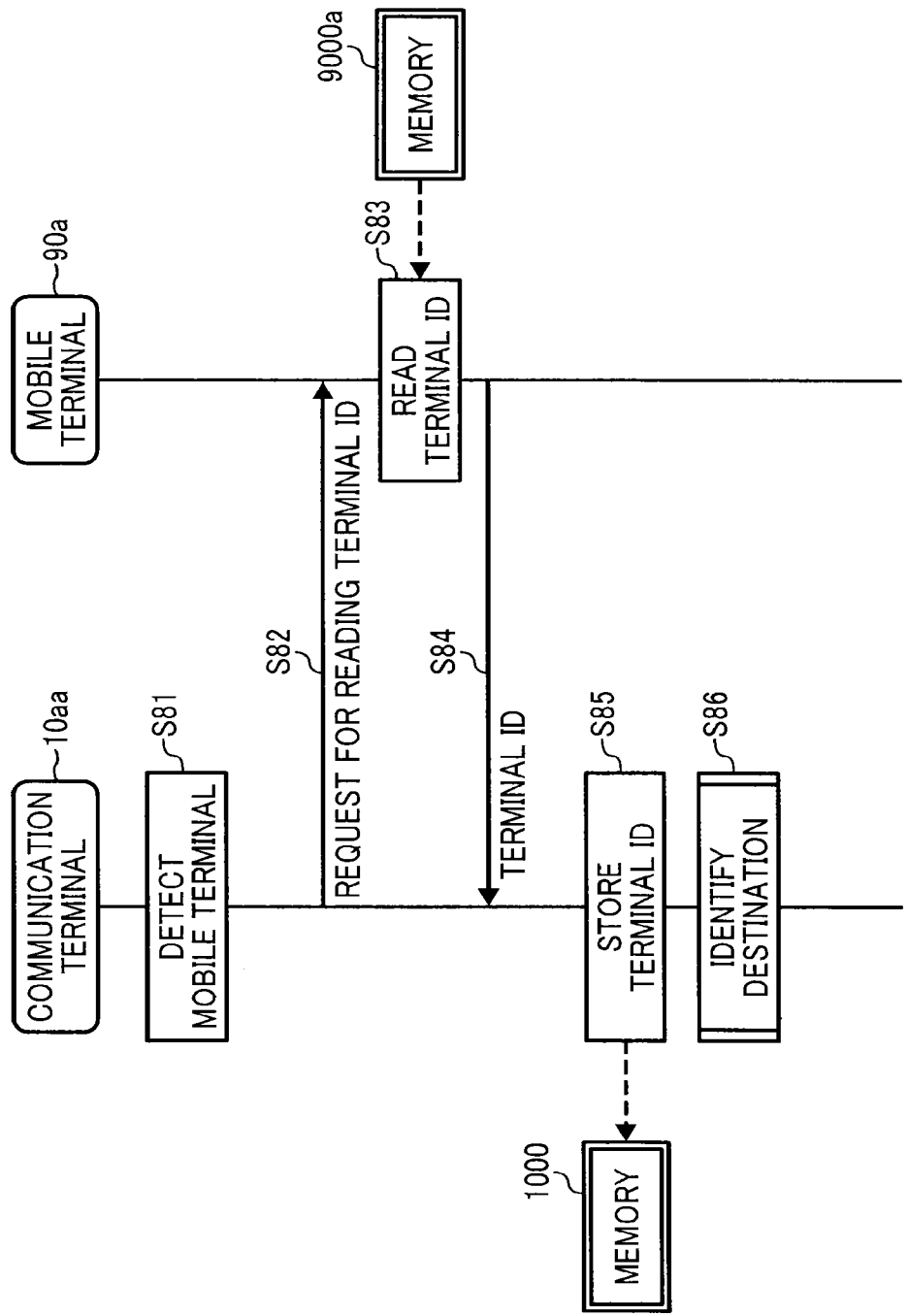
FIG. 18 is a data sequence diagram illustrating operation of providing terminal identification information, from the mobile terminal to the communication terminal of the communication system of FIG. 1, according to an embodiment of the present invention.
Figure 19:
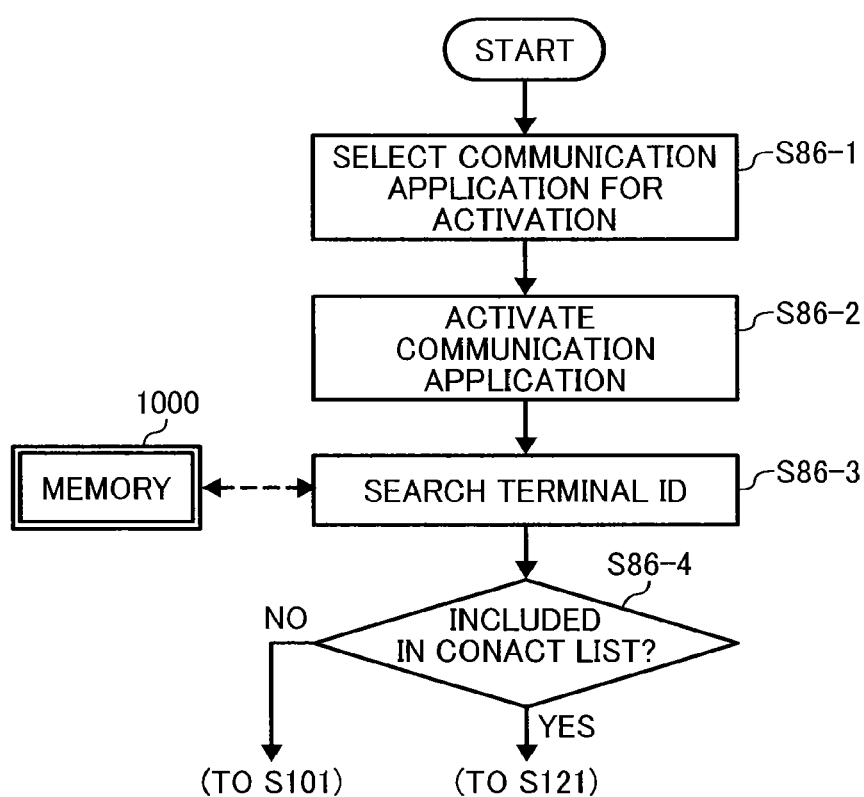
FIG. 19 is a flowchart illustrating operation of identifying a destination according to an embodiment of the present invention.

Referring to FIGS. 18 and 19, operation of obtaining terminal identification information for identifying the communication terminal 70db from the mobile terminal 90a, by the communication terminal 10, is described according to an embodiment of the present invention. FIG. 18 is a data sequence diagram illustrating operation of obtaining the terminal identification information. FIG. 19 is a flowchart illustrating operation of identifying a communication destination for the communication terminal 10.

The user X at the site A brings the mobile terminal 90a close to the communication terminal 10aa, while the contact list of FIG. 17 is being displayed on the display 120 of the communication terminal 10aa. The determiner 15 of the communication terminal 10aa determines whether any device is detected near the communication terminal 10aa. The following assumes the case in which the user X brings the mobile terminal 90a close to the communication terminal 10aa such that the mobile terminal 90a is detected.

The obtainer/provider 98a of the communication terminal 10aa transmits a request for reading the terminal identification information to the mobile terminal 90a via near-distance wireless communication (S82). The memory control 99a of the mobile terminal 90a reads out the terminal identification information (in this example, the terminal ID) of the communication terminal 70db from the memory 9000a (S83).

Next, the obtainer/provider 98a of the mobile terminal 90a transmits the terminal ID, which is read, to the communication terminal 10aa via near-distance wireless communication (S84). The obtainer/provider 18 of the communication terminal 10aa receives the terminal ID of the communication terminal 70db from the mobile terminal 90a. The memory control 19 stores the terminal ID in the memory 1000 (S85).

The communication terminal 10aa identifies a destination of communication using the terminal (terminal ID) that is received at S85 (S86). Referring to FIG. 19, S86 of identifying the destination is described.

As illustrated in FIG. 19, the selector 16 of the communication terminal 10aa selects communication application to be activated, based on the received terminal identification information (S86-1). In this example, since the terminal ID is received, the selector 16 selects the communication application A1 corresponding to the terminal ID to start communication. The activator 17 activates the communication application A1 (S86-2).

The memory control 99a searches the contact list information stored in the memory 1000 at S70 using the terminal ID received at S84 as a search key (S86-3). Based on the search, the determiner 95a determines whether the received terminal ID matches any one of the terminal IDs of the candidate counterpart terminals (S86-4). When it is determined that the received terminal ID matches any one of the terminal IDs of the candidate counterpart terminals as indicated by the contact list information ("YES" at S86-4), the operation proceeds to S121 of FIG. 22. When it is determined that the received terminal ID does not match any one of the terminal IDs in the candidate counterpart terminals as indicated by the contact list information ("NO" at S86-4), the operation proceeds to S101 of FIG. 22.

Figure 20B:
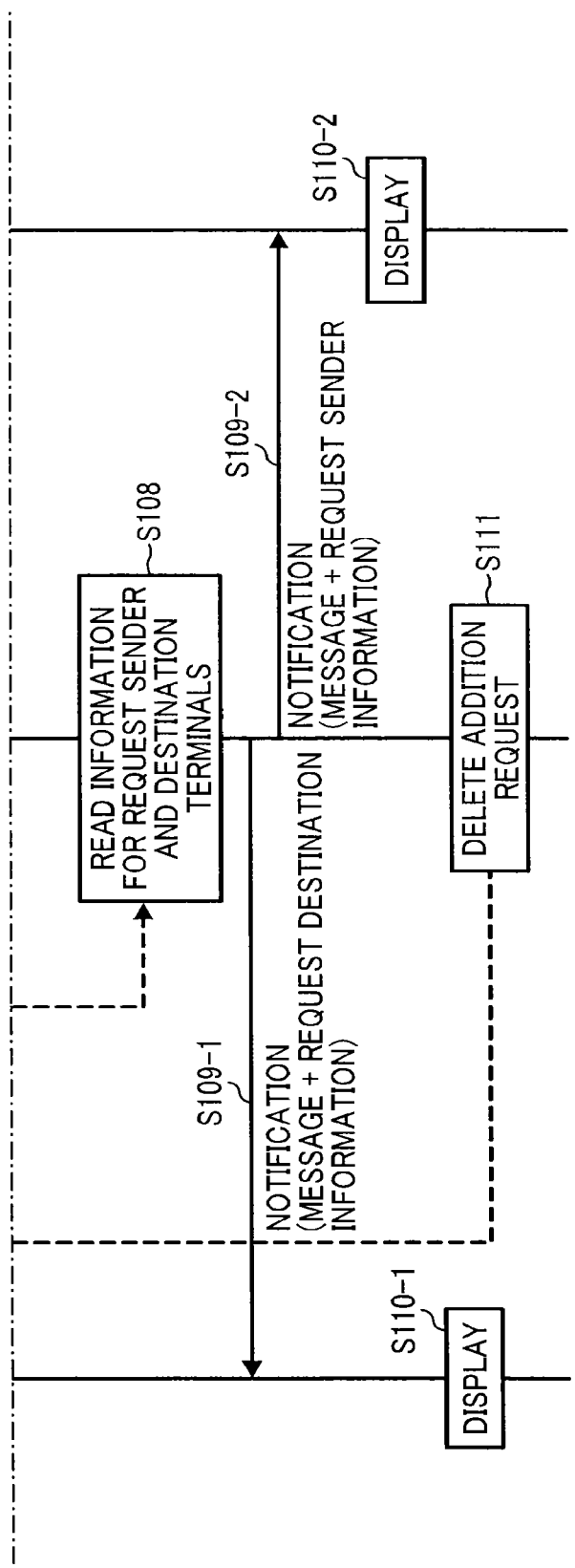

Referring to FIGS. 20 and 21, operation of adding a candidate counterpart terminal to the contact list is described according to the embodiment of the present invention. FIG. 20 is a data sequence diagram illustrating operation of adding a candidate counterpart terminal to the contact list. FIG. 21 is an example screen for requesting approval to add a candidate counterpart terminal to the contact list.

In this example, it is assumed that the terminal 10aa requests the communication terminal 70db to approve to add the communication terminal 70db to a contact list of the communication terminal 10aa. Here, the communication terminal 10aa corresponds to the request sender terminal, and the communication terminal 70db corresponds to the request destination terminal.

The transmitter/receiver 11 of the request sender terminal 10aa transmits a request for adding the counterpart terminal (addition request) to the communication management system 50 through the communication network 2 (S101). The addition request includes the terminal ID "01aa" of the request sender terminal 10aa, and the terminal ID "07db" of the request destination terminal 70db. The transmitter/receiver 51 of the management system 50 receives the addition request.

The memory control 59 of the communication management system 50 stores, for a new entry of the addition request management table (FIG. 12), the terminal ID "01aa" of the request sender terminal 10aa in a request sender terminal ID field, and the terminal ID "07db" of the request destination terminal 70db in a request destination terminal ID field (S102).

The determiner 52 searches the terminal management table (FIG. 10) using the terminal ID "07db" of the request destination terminal 70db to obtain the operating state of the communication terminal 70db (S103). When the determiner 52 determines that the request destination terminal 70db is online but has not started communication, at S104, the transmitter/receiver 51 transmits an addition approval request for requesting approval to add, to the request destination terminal 70db (S104). The addition approval request includes the terminal ID "01aa" of the request 10aa. The transmitter/receiver 71 of the request destination terminal 70db receives the addition approval request.

Next, the display control 74 of the request destination terminal 70db causes the display 753 to display an addition request response screen as illustrated in FIG. 20 (S105).

The transmitter/receiver 71 of the request destination terminal 70db transmits a response to the addition approval request, which indicates approval, rejection, or holding, to the communication management system 50 (S106). The user D, at the site D, selects "YES" key on the screen to approve the request for adding the terminal 70db to the contact list. The user D selects "NO" key on the screen to reject the request for adding the terminal 70db to the contact list. The user D selects "CANCEL" key on the screen to postpone a response to the request for adding the terminal 70db to the contact list. The transmitter/receiver 51 of the management system 50 receives the response to the addition approval request. The example case in which the response indicates approval to add the request destination terminal 70db to the contact list for the terminal 10aa.

The memory control 59 of the management system 50 registers the terminal ID "07db" of the request destination terminal 70db, in a record (contact list) for the request sender terminal 10aa in the contact list management table (FIG. 11) (S107).

If the response indicates to reject the request for adding the terminal 70db, at S107, the memory control 59 deletes the record created for the request sender terminal 10aa, in the addition request management table (FIG. 12). If the response indicates to hold the response, at S107, the memory control 59 just waits for response, while not performing anything with respect to the contact list management table or the addition request management table.

The memory control 59 searches the terminal management table (FIG. 10) using the terminal ID "01aa" of the request sender terminal 10aa and the terminal ID "07db" of the request destination terminal 70db, to obtain the terminal name and the operating state for each of the request sender terminal and the request destination terminal (S108). The transmitter/receiver 51 transmits a notification indicating completion of addition to the contact list to each of the request sender terminal 10aa and the request destination terminal 70db (S109-1, 2). The notification to be transmitted to the request sender terminal 10aa includes a message indicating completion of addition, and various information (terminal ID, terminal name, and operating state) of the request destination terminal 70db. That is, only information regarding the communication terminal 70db that is newly added is transmitted to the communication terminal 10aa. The notification to be transmitted to the request destination terminal 70db includes a message indicating completion of addition, and various information (terminal ID, terminal name, and operating state) of the request sender terminal 10aa.

The display control 14 of the request sender terminal 10aa causes the display 120 to display a screen indicating completion of addition (S110-1). The display control 74 of the request destination terminal 70db causes the display 753 to display a screen indicating completion of addition (S110-2). After S101-1 and S101-2, the memory control 59 of the communication management system 50 deletes the record created for the request sender terminal 10aa and the request destination terminal 70db, in the addition request management table (FIG. 12) (S111). The operation then automatically proceeds to S121 of FIG. 22.

Figure 22:
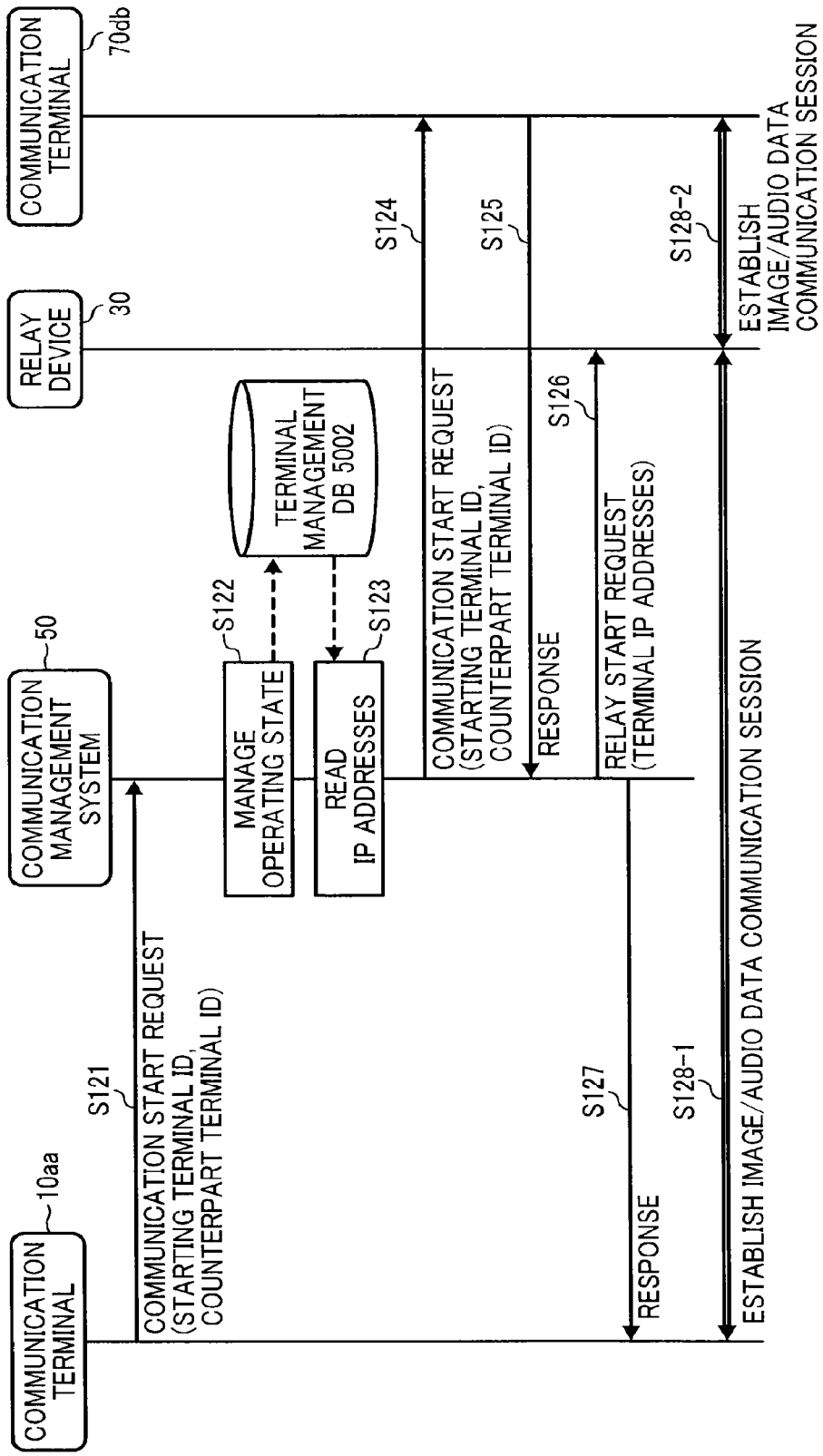
FIG. 22 is a data sequence diagram illustrating operation of preparing for transmission of image data and audio data between the communication terminals of the communication system of FIG. 1.

Referring to FIG. 22, operation of preparing for transmission of image data and audio data, performed by the communication system 1, is described according to an embodiment of the present invention. FIG. 22 is a data sequence diagram illustrating operation of preparing for transmission of image data and audio data.

When it is determined that the contact list information includes the received terminal ID ("YES" at S86-4 of FIG. 19), the user X does not have to select the communication terminal 70db, from the contact list of FIG. 17, as a counterpart terminal to start communication. In such case, the communication terminal 10aa automatically transmits a communication start request for starting communication with the counterpart terminal 70db, to the communication management system 50. Specifically, the transmitter/receiver 11 transmits a communication start request to the communication management system 50 through the communication network 2 (S121). The communication start request includes the terminal ID "01aa" of the starting terminal 10aa, and the terminal ID "07db" of the counterpart terminal 70db. The transmitter/receiver 51 of the management system 50 receives the communication start request.

On the basis of the terminal ID "01aa" of the starting terminal 10aa and the terminal ID ("07db") of the counterpart terminal 70db, which are included in the communication start request, the memory control 59 of the communication management system 50 changes the operating state field of each of records including the above-mentioned terminal IDs "01aa" and "07db" to "communicating" in the terminal management table (FIG. 10) (S122). In this state, although the starting terminal 10aa and the counterpart terminal 70db have not started communicating, these terminals enter a communicating state, and, if another terminal 10 tries to communicate with the starting terminal 10aa or the counterpart terminal 70db, a notification sound or display that indicates that the terminal is communicating is output.

Next, the memory control 59 of the communication management system 50 searches the terminal management table (FIG. 10) using the terminal ID "01aa" of the starting terminal 10aa and the terminal ID "07db" of the counterpart terminal 70db, received at S121, as search keys, to read corresponding IP addresses (S123).

The transmitter/receiver 51 of the management system 50 transmits the communication start request to the IP address of the counterpart terminal 70db, which is read at S123 (S124). The communication start request includes the terminal IDs "01aa" and "07db", as received at S121. The transmitter/receiver 71 of the counterpart terminal 70db receives the communication start request.

The transmitter/receiver 71 of the counterpart terminal 70db transmits a response to the communication start request, to the communication management system 50 (S125). The transmitter/receiver 51 of the management system 50 receives the response to the communication start request. The communication start request indicates whether to accept or reject communication. The example case of accepting the communication start request is described.

The transmitter/receiver 51 of the management system 50 transmits a relay start request indicating a request for starting relaying to the relay device 30 (S126). The relay start request includes the IP addresses of the starting terminal 10aa and the counterpart terminal 70db read at S123. The transmitter/receiver 31 of the relay device 30 receives the relay start request.

The transmitter/receiver 51 of the management system 50 transmits the response to the communication start request, which is received at S125, to the starting terminal 10aa (S127). As described above, in this example, the transmitter/receiver 11 of the starting terminal 10aa receives the response accepting the communication start request.

As described above, the starting terminal 10aa and the counterpart terminal 70db establish an image data/audio data communication session via the relay device 30 (S128-1, 2) to start videoconference.

As described above, according to some embodiments of the present invention, at the site D the mobile terminal 90a operated by the user X obtains terminal identification information of the communication terminal 70, from the communication terminal 70. The mobile terminal 90a, after moving to the site A, provides the obtained terminal identification information to the communication terminal 10. The communication terminal 10, which obtains the identification information of the counterpart communication terminal 70, starts communication with the counterpart communication terminal 70.

This simplifies a process of preparing to start communication, thus reducing the time for preparing to start communication between the communication terminal 10 and the communication terminal 70.

More specifically, based on the terminal identification information of the counterpart communication terminal 70, the communication terminal 10 automatically identifies a communication destination of the communication terminal 10, using the obtained terminal identification information. This eliminates a need for manually selecting a counterpart communication terminal from among a plurality of candidate counterpart communication terminals in the contact list.

Further, even when the communication terminal 70 as the communication destination is not registered in the contact list for the communication terminal 10 as the starting terminal, the communication terminal 10 automatically sends a request for approval to add the communication terminal 70 to the contact list of the communication terminal 10. Based on a response indicating approval, the communication terminal 10 adds the communication terminal 70 to the contact list, and starts communication with the communication terminal 70. This further eliminates a need for entering a request for addition approval, or manually adding the communication terminal 70 to the contact list.

Further, even when a plurality of types of communication application is installed on the respective communication terminals, the communication terminal 10 automatically selects communication application to be used for communicating with the counterpart communication terminal 70, based on a type of terminal identification information of the counterpart communication terminal 70. Further, the terminal identification information, which is used to select specific communication application, does not have to be manually entered. This further simplifies the process to start communication with the counterpart communication terminal.

In the above-described embodiment, the example case in which the mobile terminal 90a moves from the site D to the site A, along with the user X. However, the above-described embodiment is applicable to the other situation. In one example, the mobile terminal 90 operated by the user Y may move from the site D to the site A, along with the user Y. In another example, the mobile terminal 90 operated by the user X may move from the site A to the site D, after the mobile terminal 90 obtains the terminal identification information of the communication terminal 10 at the site A.

In the above-described embodiment, the communication terminal (10, 70) provides the terminal identification information to the mobile terminal 90 by near-distance wireless communication, the communication terminal may provide using any other communication network including a wired network such as by a USB cable. In addition, although the case of a videoconference terminal has been described as an example of a communication terminal in the above-described embodiment, the embodiment is not limited to this case, and the communication system 1 may be a phone system such as an IP phone system or an Internet phone system. In addition, a smart phone, a smart watch, a mobile phone, a car navigation terminal, a wearable computer, a monitoring camera, a digital camera communicable using WiFi, any communication device (a projector, a game machine), a digital signage, or industrial equipment with a communication function may be used. A wearable computer includes a watch and a head-mounted display. Industrial equipment includes office equipment such as a multifunction peripheral (MFP)/printer/product, medical equipment such as an endoscope, a Computed Tomography (CT) scan, and radiotherapy equipment, and agricultural equipment such as a cultivator.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, audio data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

In case the communication terminal 70 is implemented as the electronic whiteboard, because of its relatively large size, the functions of the communication management system 50 and/or the relay device 30 may be incorporated in the communication terminal 70. In such case, the terminal at the site A and the terminal at the site D can be communicated via the Intranet, configuring the on-premises system. This improves a level of security.

In the above-described embodiment, the recording request or the reading request is transmitted or received by near-distance wireless communication. Alternatively, such request may be transmitted or received by ultrasonic communication. In alternative to transmitting the recording request, the communication terminal 10 or 70 may display an image encoded with the terminal ID (for example, in the form of a bi-dimensional bar code or a QR code). The mobile terminal 90a may capture the image with the camera to obtain the terminal ID of the communication terminal 10 or 70, and store the obtained the terminal ID in its memory. In alternative to transmitting the reading request, the communication terminal 10 or 70 may display an image encoded with the terminal ID (for example, in the form of a bi-dimensional bar code or a QR code). The mobile terminal 90a may capture the image with the camera to obtain the terminal ID of the communication terminal 10 or 70.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication terminal, configured to communicate with a counterpart communication terminal, the communication terminal comprising:
    a receiver to receive, from a mobile terminal, first counterpart terminal identification information for identifying a first counterpart communication terminal that is located remotely from the communication terminal and different from the mobile terminal, the mobile terminal being a mobile terminal that has obtained the first counterpart terminal identification information from the first counterpart communication terminal by near-distance wireless communication at a previous time when the mobile terminal was co-located with the first counterpart communication terminal;
    a memory to store a plurality of applications that are different from each other; and
    circuitry to:
        determine one of the plurality of applications to be used for communicating with the counterpart communication terminal, based on the counterpart terminal identification information received from the mobile terminal, and
        determine the first counterpart communication terminal identified with the first counterpart terminal identification information as a communication destination, and start communicating with the first counterpart communication terminal using the application that is determined, without requiring a user input of the counterpart terminal identification information.

2. The communication terminal of claim 1, further comprising:
    a transmitter to transmit a request for starting communication with the first communication terminal,
    wherein the receiver receives the first terminal identification information from the mobile terminal by near-distance wireless communication, and
    the transmitter transmits the request to the first communication terminal via a network.

3. The communication terminal of claim 2, wherein the near-distance wireless communication includes one of near-field communication (NFC) and Bluetooth.

4. The communication terminal of claim 2, wherein:
the circuitry transmits the request for starting communication with the first communication terminal via a communication management system.

5. The communication terminal of claim 1, wherein:
a description format of the counterpart terminal identification information indicates whether the counterpart terminal identification information is one of a terminal identifier identifying the counterpart communication terminal, an IP address to be used for accessing the counterpart communication terminal, and an email address assigned to the counterpart communication terminal.

6. A method of communicating, comprising:
receiving, from a mobile terminal, counterpart terminal identification information for identifying a counterpart communication terminal that is located remotely from the communication terminal and different from the mobile terminal, the mobile terminal being a mobile terminal that has obtained the counterpart terminal identification information from the counterpart communication terminal by near-distance wireless communication at a previous time when the mobile terminal was co-located with the counterpart communication terminal;
determining one of a plurality of applications that are stored in a memory and different from each other to be used for communicating with the counterpart communication terminal, based on the counterpart terminal identification information received from the mobile terminal; and
determining the counterpart communication terminal identified with the counterpart terminal identification information as a communication destination, and start communicating with the counterpart communication terminal using the application that is determined, without requiring a user input of the counterpart terminal identification information.

7. The method of claim 6, further comprising:
transmitting a request for starting communication with the first communication terminal via a network,
wherein the receiving receives the first terminal identification information from the mobile terminal by near-distance wireless communication.

8. The method of claim 7, wherein the near-distance wireless communication includes one of near-field communication (NFC) and Bluetooth.

9. The method of claim 7, wherein:
the transmitting transmits the request for starting communication with the first communication terminal via a communication management system.

10. The method of claim 6, wherein:
a description format of the counterpart terminal identification information indicates whether the counterpart terminal identification information is one of a terminal identifier identifying the counterpart communication terminal, an IP address to be used for accessing the counterpart communication terminal, and an email address assigned to the counterpart communication terminal.

11. A non-transitory computer readable medium for execution by a computing device and which includes programming to perform a method of communicating, comprising:
receiving, from a mobile terminal, counterpart terminal identification information for identifying a counterpart communication terminal that is located remotely from the communication terminal and different from the mobile terminal, the mobile terminal being a mobile terminal that has obtained the counterpart terminal identification information from the counterpart communication terminal by near-distance wireless communication at a previous time when the mobile terminal was co-located with the counterpart communication terminal;
determining one of a plurality of applications that are stored in a memory and different from each other to be used for communicating with the counterpart communication terminal, based on the counterpart terminal identification information received from the mobile terminal; and
determining the counterpart communication terminal identified with the counterpart terminal identification information as a communication destination, and start communicating with the counterpart communication terminal using the application that is determined, without requiring a user input of the counterpart terminal identification information.

12. The non-transitory computer readable medium of claim 11, further comprising programming to perform the method of communicating which further includes:
transmitting a request for starting communication with the first communication terminal via a network,
wherein the receiving receives the first terminal identification information from the mobile terminal by near-distance wireless communication.

13. The non-transitory computer readable medium of claim 12, wherein the near-distance wireless communication includes one of near-field communication (NFC) and Bluetooth.

14. The non-transitory computer readable medium of claim 12, wherein:
the transmitting transmits the request for starting communication with the first communication terminal via a communication management system.

15. The non-transitory computer readable medium of claim 11, wherein:
a description format of the counterpart terminal identification information indicates whether the counterpart terminal identification information is one of a terminal identifier identifying the counterpart communication terminal, an IP address to be used for accessing the counterpart communication terminal, and an email address assigned to the counterpart communication terminal.

* * * * *